(12) United States Patent
Moriguchi et al.

(10) Patent No.: US 9,288,942 B2
(45) Date of Patent: Mar. 22, 2016

(54) ELECTRIC RIDING MOWER HAVING AIR-COOLED CHASSIS AND PIVOTABLE PROTECTIVE COWLING

(75) Inventors: Kazuma Moriguchi, Osaka (JP);
Shinichi Motegi, Osaka (JP); Keiji Matsumoto, Osaka (JP); Mitsuhiro Nakagaki, Osaka (JP); Tomoyuki Ebihara, Osaka (JP)

(73) Assignee: YANMAR CO., LTD., Osaka-Shi (JP)

( * ) Notice: Subject to any disclaimer, the term of this patent is extended or adjusted under 35 U.S.C. 154(b) by 776 days.

(21) Appl. No.: 13/501,195

(22) PCT Filed: Nov. 10, 2010

(86) PCT No.: PCT/JP2010/070032
§ 371 (c)(1),
(2), (4) Date: Apr. 10, 2012

(87) PCT Pub. No.: WO2011/108151
PCT Pub. Date: Sep. 9, 2011

(65) Prior Publication Data
US 2012/0186887 A1 Jul. 26, 2012

(30) Foreign Application Priority Data

Mar. 1, 2010 (JP) .................................. 2010-044481
Mar. 10, 2010 (JP) .................................. 2010-052855
Mar. 10, 2010 (JP) .................................. 2010-053200
Mar. 15, 2010 (JP) .................................. 2010-057015

(51) Int. Cl.
*A01D 69/00* (2006.01)
*A01D 69/02* (2006.01)
(Continued)

(52) U.S. Cl.
CPC ................ *A01D 69/02* (2013.01); *A01D 67/00* (2013.01); *B60L 1/003* (2013.01); *B60L 3/0046* (2013.01); *B60L 3/04* (2013.01); *B60L 11/1803* (2013.01); *B60L 11/1816* (2013.01); *B60L 11/1866* (2013.01); *B60L 2200/22* (2013.01); *B60L 2220/42* (2013.01); *B60L 2220/44* (2013.01); *B60L 2240/421* (2013.01);
(Continued)

(58) Field of Classification Search
USPC ............ 180/6.32, 68.1, 68.2; 56/1, 322, 323, 56/320.1, DIG. 18; D12/177–179
See application file for complete search history.

(56) References Cited

U.S. PATENT DOCUMENTS 3,438,454 A * 4/1969 Kernohan et al. ............ 180/68.1
3,732,671 A 5/1973 Allen et al.
(Continued)

FOREIGN PATENT DOCUMENTS

JP H02-222613 A 9/1990
JP 05076228 A * 3/1993
(Continued)

*Primary Examiner* — Alicia Torres
(74) *Attorney, Agent, or Firm* — Birch, Stewart, Kolasch & Birch, LLP

(57) ABSTRACT

An electric riding mower efficiently cools a motor driver. The mower includes two running motors 16 independently driving paired rear tires 13; a mower blade mowing grass by being rotated; a mowing motor 15 rotating the mower blade; a battery 25 supplying electric power to the running motors 16 and the mowing motor 15; and a mower-motor driver MD controlling the rotational speed of the mowing motor 15, wherein the mower-motor driver MD is disposed in a driver storage part on a front part of the mower, and a slit 33SL taking in external air is disposed on a front surface of the driver storage part.

2 Claims, 32 Drawing Sheets

(51) Int. Cl.
  B60L 1/00 (2006.01)
  B60L 3/00 (2006.01)
  B60L 3/04 (2006.01)
  B60L 11/18 (2006.01)
  A01D 67/00 (2006.01)

(52) U.S. Cl.
  CPC .......... *B60L 2250/16* (2013.01); *Y02T 10/648* (2013.01); *Y02T 10/7005* (2013.01); *Y02T 10/7061* (2013.01); *Y02T 90/14* (2013.01)

(56) References Cited

U.S. PATENT DOCUMENTS

| | | | |
|---|---|---|---|
| 4,307,561 A | 12/1981 | Hicks | |
| 4,771,844 A * | 9/1988 | Bassett | 180/68.1 |
| 4,944,142 A | 7/1990 | Sueshige et al. | |
| 5,347,799 A | 9/1994 | Hosaka et al. | |
| 5,406,778 A * | 4/1995 | Lamb et al. | 56/7 |
| 5,502,957 A * | 4/1996 | Robertson | 56/11.9 |
| 5,641,031 A | 6/1997 | Riemer et al. | |
| 5,934,051 A * | 8/1999 | Hahn | 56/10.2 R |
| 5,934,053 A | 8/1999 | Fillman et al. | |
| 6,082,084 A * | 7/2000 | Reimers et al. | 56/11.9 |
| 7,578,116 B1 | 8/2009 | Howell | |
| 8,191,343 B1 * | 6/2012 | Hauser et al. | 56/11.9 |
| 8,578,687 B2 * | 11/2013 | Ebihara et al. | 56/17.1 |
| 2003/0037525 A1 | 2/2003 | Iida et al. | |
| 2004/0212352 A1 | 10/2004 | Anzawa et al. | |
| 2008/0099262 A1 | 5/2008 | Phillips | |
| 2008/0264026 A1 | 10/2008 | Ishii et al. | |
| 2009/0173554 A1 | 7/2009 | Yoshioka | |
| 2010/0289295 A1 | 11/2010 | Yoda et al. | |

FOREIGN PATENT DOCUMENTS

| | | | |
|---|---|---|---|
| JP | 5-185961 | A | 7/1993 |
| JP | H05-192027 | A | 8/1993 |
| JP | H06-46634 | A | 2/1994 |
| JP | 6-74660 | U | 10/1994 |
| JP | 6-343205 | A | 12/1994 |
| JP | 9-188144 | A | 7/1997 |
| JP | 3053326 | B2 | 4/2000 |
| JP | 2001-30917 | A | 2/2001 |
| JP | 2001-157302 | A | 6/2001 |
| JP | 2001-262626 | A | 9/2001 |
| JP | 2002-85477 | A | 3/2002 |
| JP | 3329846 | B2 | 9/2002 |
| JP | 2003-204839 | A | 7/2003 |
| JP | 3510457 | B2 | 3/2004 |
| JP | 2005-47503 | A1 | 2/2005 |
| JP | 2005-304122 | A | 10/2005 |
| JP | 3848635 | B2 | 9/2006 |
| JP | 2007-520180 | A | 7/2007 |
| JP | 2007-270778 | A | 10/2007 |
| JP | 2007-312722 | A | 12/2007 |
| JP | 2008-152956 | A | 7/2008 |
| JP | 2008-172975 | A | 7/2008 |
| JP | 2008-265685 | A | 11/2008 |
| JP | 4284335 | B2 | 3/2009 |
| JP | 2009-83598 | A | 4/2009 |
| JP | 2009-179129 | A | 8/2009 |
| JP | 2009-214704 | A | 9/2009 |
| JP | 2009-274665 | A | 11/2009 |
| WO | WO 2005/038952 | A2 | 4/2005 |

* cited by examiner

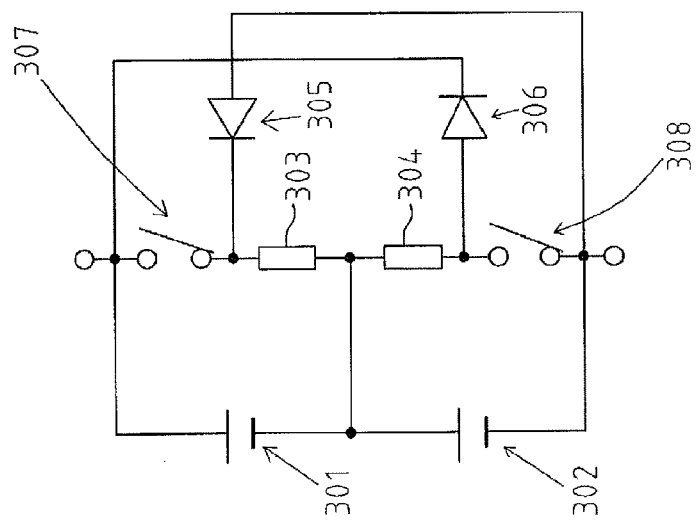
FIG. 17c
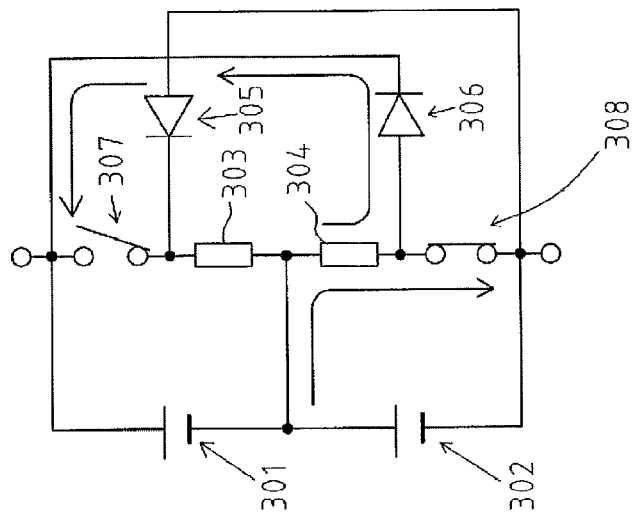
FIG. 17b
FIG. 17a

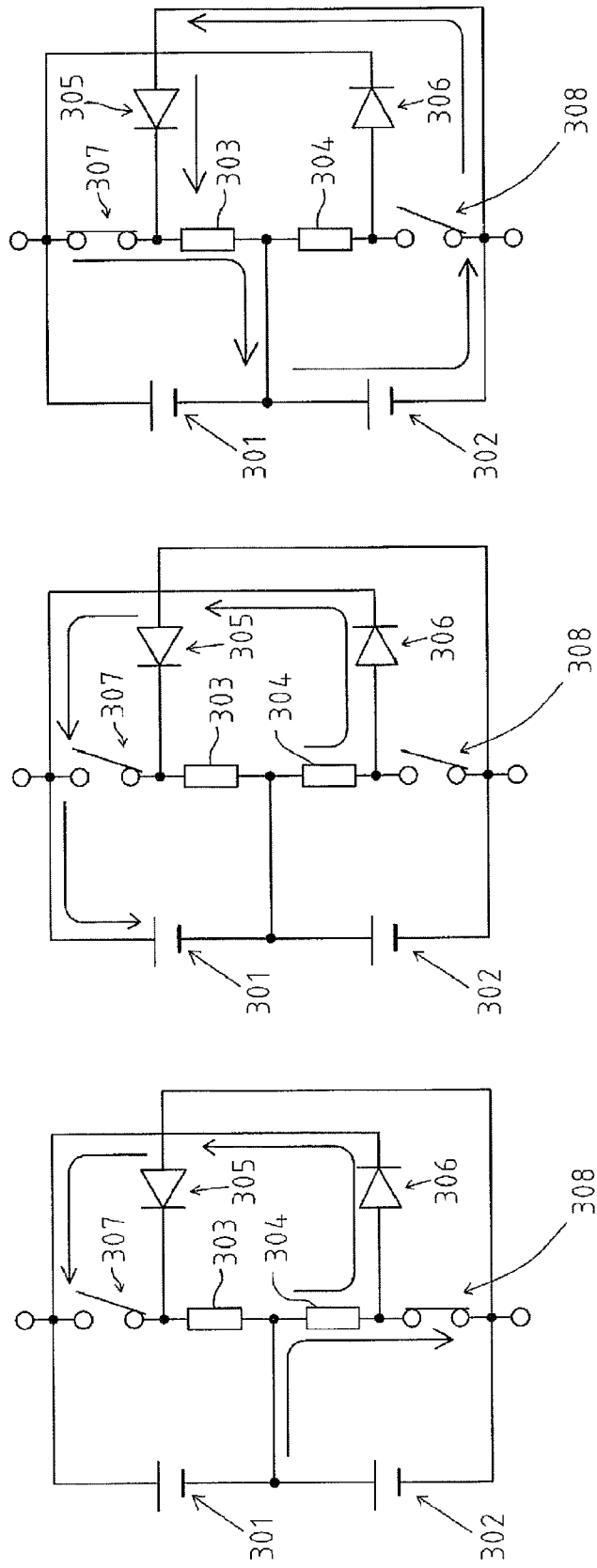

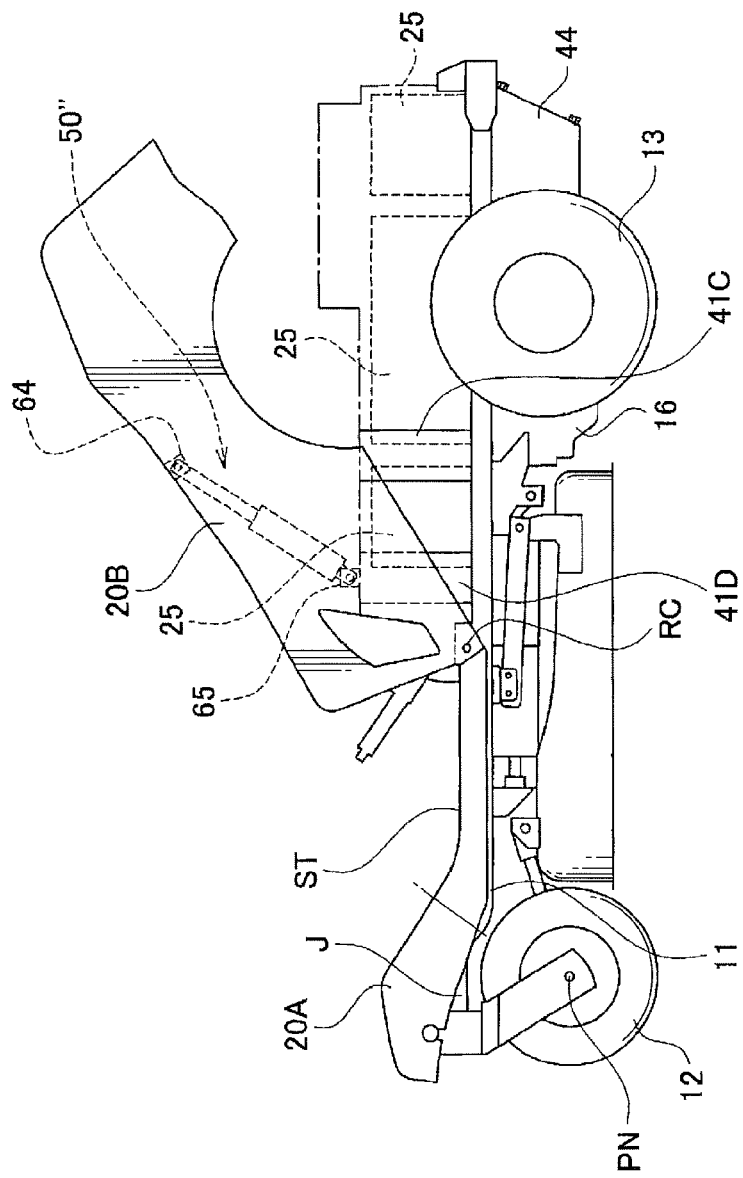

ELECTRIC RIDING MOWER HAVING AIR-COOLED CHASSIS AND PIVOTABLE PROTECTIVE COWLING

TECHNICAL FIELD

The present invention relates to an electric riding mower including two running motors independently driving paired driving wheels, a mower blade mowing grass by being rotated, a mowing motor rotating the mower blade, and a battery supplying electric power to the running motors and the mowing motor.

BACKGROUND ART

Recently, there has been a social movement of restricting exhaust gases, including greenhouse gases, from the perspective of global warming prevention. The response to such a movement has been especially notable in the automobile industry, and the development of so-called eco-cars, such as hybrid cars and electric vehicles, has been promoted. In particular, there has been an active technological development in commercializing electric vehicles using batteries as power sources.

For electric vehicles, in addition to reduction in the battery size and motor size, size reduction in the electronic devices controlling the batteries and motors is a technical problem. There are other problems in reducing the size of electronic devices. That is, to reduce the size of an electronic device, the electronic circuits therein must be integrated. An increase in the electronic circuit density per unit area causes an increase in the amount of heat generation (current flowing through the circuit) per unit area of the electronic circuit, and thus there is a problem in that normal operation of the electronic circuit is inhibited due to an increase in the amount of heat generation. Hence, size reduction of electronic devices and cooling of such electronic devices are problems that must be solve simultaneously.

To solve such two problems, a technical proposition focusing on a motor driver of an in-wheel motor has been made. The corresponding document aims for solving the technical problems described above by changing the electronic circuit provided for the motor driver. That is, the motor driver includes voltage changing means for changing the motor driving voltage. Specifically, the voltage changing means decreases the motor driving voltage in a low-speed rotation range of the motor and increase it in a high-speed rotation range to prevent an excessive current from being unnecessarily applied to the motor driver during low-speed rotation and to reduce the amount of heat generation in the motor driver.

CITATION LIST

Patent Literature

PLT 1: Japanese Patent Document: Japanese Unexamined Patent Application Publication No. 2008-172975

SUMMARY OF INVENTION

Technical Problem

However, such technical development is not desirable because it leads to sophistication and complication of the electronic devices and causes failures to occur more frequently. Thus, it is necessary to efficiently cool a motor driver without causing sophistication and complication of the electronic devices. Accordingly, the present invention provides an electric riding mower that has a simple configuration and efficiently cools a motor driver.

Solution to Problem

An electric riding mower according to the present invention includes two running motors independently driving paired driving wheels; a mower blade mowing grass by being rotated; a mowing motor rotating the mower blade; a battery supplying electric power to the running motors and the mowing motor; and a mower-motor driver controlling the rotational speed of the mowing motor, wherein the mower-motor driver is disposed in a driver storage part on a front part of the mower, and an air intake part taking in external air is disposed on a front surface of the driver storage part.

The air intake part may include a screen for preventing intrusion of scattered objects.

A fan disposed behind and adjacently to the air intake part and for supporting intake of external air may be provided.

The electric riding mower may further include a pair of left and right chassis, wherein the driver storage part may be interposed between the chassis, and front end parts of the chassis are inclined forward and upward.

An operator's seat, a cowling covering the chassis from above, and a step configured to place feet of an operator seated in the operator's seat and configured as part of the cowling may be provided; and a front end part of the step may be inclined forward and upward along the chassis.

The air intake part may be a slit.

A battery controller monitoring the voltage of the battery may be further included; and current interrupting means for interrupting a current supply from the battery to the mowing motor and the running motors may be disposed in the battery controller, and a system controller may be disposed outside the battery controller to operate the current interrupting means.

The battery controller may include a safety plug.

A chassis and a plurality of the batteries may be further included, and the batteries may be disposed horizontally on a rear part of the chassis.

The electric riding mower may further include a cowling covering the entire chassis from above; an operator's seat, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the step support panel, a groove may be formed in the step support panel to pivotably fix one end of the damper in the groove, and a cowling-damper connecting device may be fixed to the back side of the cowling to pivotably fix the other end of the damper.

The electric riding mower may further include a cowling covering the entire chassis from above; an operator's seat; and a protective frame covering the battery from above for protection, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the protective frame, the cowling may be separated into a front half and a rear half, respectively constituting a front cowling and a rear cowling, a frame-damper connecting device may be fixed to the protective frame to pivotably fix one end of the damper, and a cowling-damper connecting device may be fixed to the back side of the rear cowling to pivotably fix the other end of the damper.

The electric riding mower may further include a cowling covering the entire chassis from above; an operator's seat; and a protective frame covering the battery from above for protection, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the protective frame, a frame-damper connecting device may be fixed to the protective frame to pivotably fix one end of the damper, and a cowling-damper connecting device may be fixed to the back side of the cowling to pivotably fix the other end of the damper.

The damper may be two dampers disposed side by side in the width direction of the mower.

The electric riding mower may further include a second battery supplying electric power to the running motors and the mowing motor below a rear part of the chassis, wherein the paired running motors may be interposed between the paired driving wheels, and the second battery may be interposed between the paired running motors.

The electric riding mower may further include an operator's seat; and paired running operation levers disposed on left and right sides of the operator's seat and operating the running speed, forward traveling, and rearward traveling, wherein the mower may travel forward/rearward by rotating the running motors in response to tilting the running operation levers forward/rearward with respect to the traveling direction of the operator, the running operation lever may have a grip, and the running operation lever may have a plurality of different grip positions on the grip.

The grip positions may differ in the height direction.

The grip positions may differ in the mower width direction.

The grip positions may differ in the anteroposterior direction.

A display unit displaying the running speed and the rotation status of the mower blades may be disposed adjacently to the grip.

Advantageous Effects of Invention

An electric riding mower according to the present invention includes two running motors independently driving paired driving wheels; a mower blade mowing grass by being rotated; a mowing motor rotating the mower blade; a battery supplying electric power to the running motors and the mowing motor; and a mower-motor driver controlling the rotational speed of the mowing motor, wherein the mower-motor driver is disposed in a driver storage part on a front part of the mower, and an air intake part taking in external air is disposed on a front surface of the driver storage part. Thus, as the electric riding mower runs, external air can be effectively taken in to the driver storage part through the air intake part. In this way, the motor driver can be efficiently cooled. Thus, increased heat due to size reduction and integration of the motor driver can be efficiently cooled. Hence, an electric riding mower that has a simple configuration and efficiently cools a motor driver can be provided.

By providing a screen for preventing intrusion of scattered objects on the air intake part, grass mowed by the mower blade is prevented from scattering and entering through the air intake part. In this way, operational failures due to scattered objects attaching to the mower-motor driver can be prevented.

By providing a fan disposed behind and adjacently to the air intake part and for supporting intake of external air, the mower-motor driver can be cooled even more efficiently.

The electric riding mower may further include a pair of left and right chassis, wherein the driver storage part may be interposed between the chassis, and front end parts of the chassis may be inclined forward and upward. In this way, the total length of the electric riding mower may be reduced while disposing the driver storage part between the paired chassis. By reducing the total length of the electric riding mower, the wheel space can be reduced, enabling turning with a small radius. In this way, the operability of the electric riding mower is improved.

An operator's seat, a cowling covering the chassis from above, and a step configured to place feet of an operator seated in the operator's seat and configured as part of the cowling may be provided, and a front end part of the step may be inclined forward and upward along the chassis. In this way, the upper surface of the front end part of the step is disposed with an inclination toward the operator's seat. In this way, the operator can comfortably place his or her feet on the front end part of the step, and comfort of operation can be improved.

If the air intake part is a slit, intrusion of scattered objects through the air intake part may be effectively prevented while effectively taking in external air.

A battery controller monitoring the voltage of the battery may be further included; and current interrupting means for interrupting a current supply from the battery to the mowing motor and the running motors may be disposed in the battery controller, and a system controller may be disposed outside the battery controller to operate the current interrupting means. In this way, controlling means for operating the current interrupting means does not have to be separately provided inside the battery controller. In this way, an electric riding mower having a small battery controller can be provided.

If the battery controller includes a safety plug, the battery controller can be safely and easily removed from the electric riding mower.

By providing a chassis and a plurality of batteries and by disposing the batteries are dispose horizontally on a rear part of the chassis, mowing can be carried out for a long period of time without charging. Additionally, the center of gravity of the mower can be kept low, enabling stable running even when the mower is in an unstable state such as turning or running on an uneven path. Hence, a self-propelled electric riding mower that is capable of continuous operation for a long period of time and that has a low center of gravity can be provided.

The electric riding mower may further include a cowling covering the entire chassis from above; and an operator's seat, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the step support panel, a groove may be formed in the step support panel to pivotably fix one end of the damper in the groove, and a cowling-damper connecting device may be fixed to the back side of the cowling to pivotably fix the other end of the damper. In this way, the cowling can be easily lifted with the support of the damper. Since one of the ends of the damper is attached to the groove formed in the step support panel, a new member is not required, and the work efficiency during assembly can be improved.

The electric riding mower may further include a cowling covering the entire chassis from above; an operator's seat; and a protective frame covering the battery from above for protection, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the protective frame, the cowling may be separated into a front half and a rear half, respectively constituting a front cowling and a rear cowling, a frame-damper connecting device may be fixed to the protective frame to pivotably fix one end of the damper, and a cowling-damper connecting device may be fixed to the back side of the rear cowling to pivotably fix the other end of the damper. In this way, the cowling can be easily lifted with the support of the damper.

The electric riding mower may further include a cowling covering the entire chassis from above; an operator's seat; and a protective frame covering the battery from above for protection, wherein a cowling pivot support point allowing the cowling to pivot above the chassis may be disposed on a front part of the mower, a step configured to place feet of an operator seated in the operator's seat may be disposed on the cowling, a step support panel supporting the step from below may be fixed to the chassis, a damper supporting the opening/closing of the cowling may be interposed between a back side of the cowling and the protective frame, a frame-damper connecting device may be fixed to the protective frame to pivotably fix one end of the damper, and a cowling-damper connecting device may be fixed to the back side of the cowling to pivotably fix the other end of the damper. In this way, the cowling can be easily lifted with the support of the damper. Additionally, since the cowling is separated into a front half and a rear half, the weight of the cowling lifted by the damper is reduced, and maintenance and inspection can be carried out easily.

By providing two dampers disposed side by side in the width direction of the mower, the cowling can be easily lifted with the support of the damper.

The electric riding mower may further include a second battery supplying electric power to the running motors and the mowing motor below a rear part of the chassis, wherein the paired running motors may be interposed between the paired driving wheels, and the second battery may be interposed between the paired running motors. In this way, the center of gravity of the mower can be lowered even more, improving the running stability.

The electric riding mower may further include an operator's seat; and paired running operation levers disposed on left and right sides of the operator's seat and operating the running speed, forward traveling, and rearward traveling, wherein the mower may travel forward/rearward by rotating the running motors in response to tilting the running operation levers forward/rearward with respect to the traveling direction of the operator, the running operation lever may have a grip, and the running operation lever may have a plurality of different grip positions on the grip. In this way, the operator can select an optimal grip position from a plurality of grip positions. Thus, the operating posture can be changed easily, easily enabling operation for long periods of time.

Hence, an electric riding mower that enables comfortable operation for a long period of time can be provided.

If the grip positions differ in the height direction, the operator can change his or her operating posture vertically, making operation easy for a long period of time. Hence, an electric riding mower that enables comfortable operation for a long period of time can be provided.

If the grip positions differ in the mower width direction, the operator can change his or her operating posture left-to-right direction (mower width direction) by spreading or folding his or her arms, making operation easy for a long period of time. Hence, an electric riding mower that enables comfortable operation for a long period of time can be provided.

If the grip positions differ in the anteroposterior direction, the operator can change his or her operating posture in anteroposterior direction, making operation easy for a long period of time. Hence, an electric riding mower that enables comfortable operation for a long period of time can be provided.

A display unit displaying the running speed and the rotation status of the mower blades may be disposed adjacently to the grip. In this way, the running speed and the rotation status of the mower blades can be confirmed without looking away while running, and an electric riding mower having excellent safety can be provided.

BRIEF DESCRIPTION OF DRAWINGS

FIG. 8 illustrates the front surface part, where

FIGS. 17(a) to 17(c) illustrate the principle of a voltage-equalizing circuit.

FIGS. 18(a) to 18(c) illustrate the principle of a circuit for overcurrent protection.

FIG. 23 illustrates the electric lawnmower in FIG. 22, where

FIG. 24 is a side view illustrating an electric lawnmower according to another embodiment with the cowling open.

FIG. 25 illustrates the battery layout of an electric lawnmower of another embodiment, where

FIG. 31(a) is a front view, and FIGS. 31(b) and 31(c) are plan views.

FIG. 32 illustrates running operation levers according to other embodiments of the present invention, where

DESCRIPTION OF EMBODIMENTS

Figure 1:
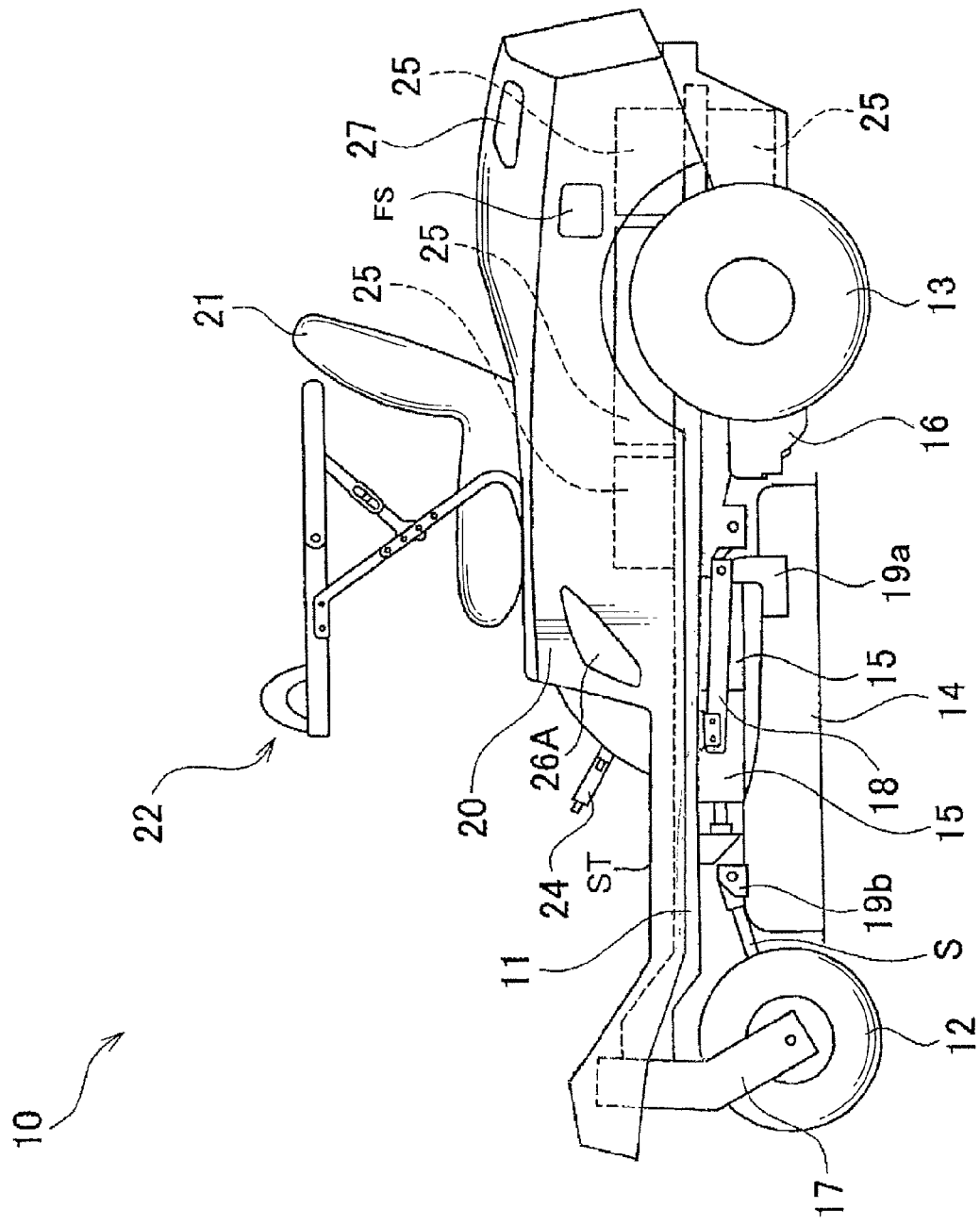
FIG. 1 is a side view of an electric lawnmower, which is an example electric riding mower according to the present invention.
Figure 2:
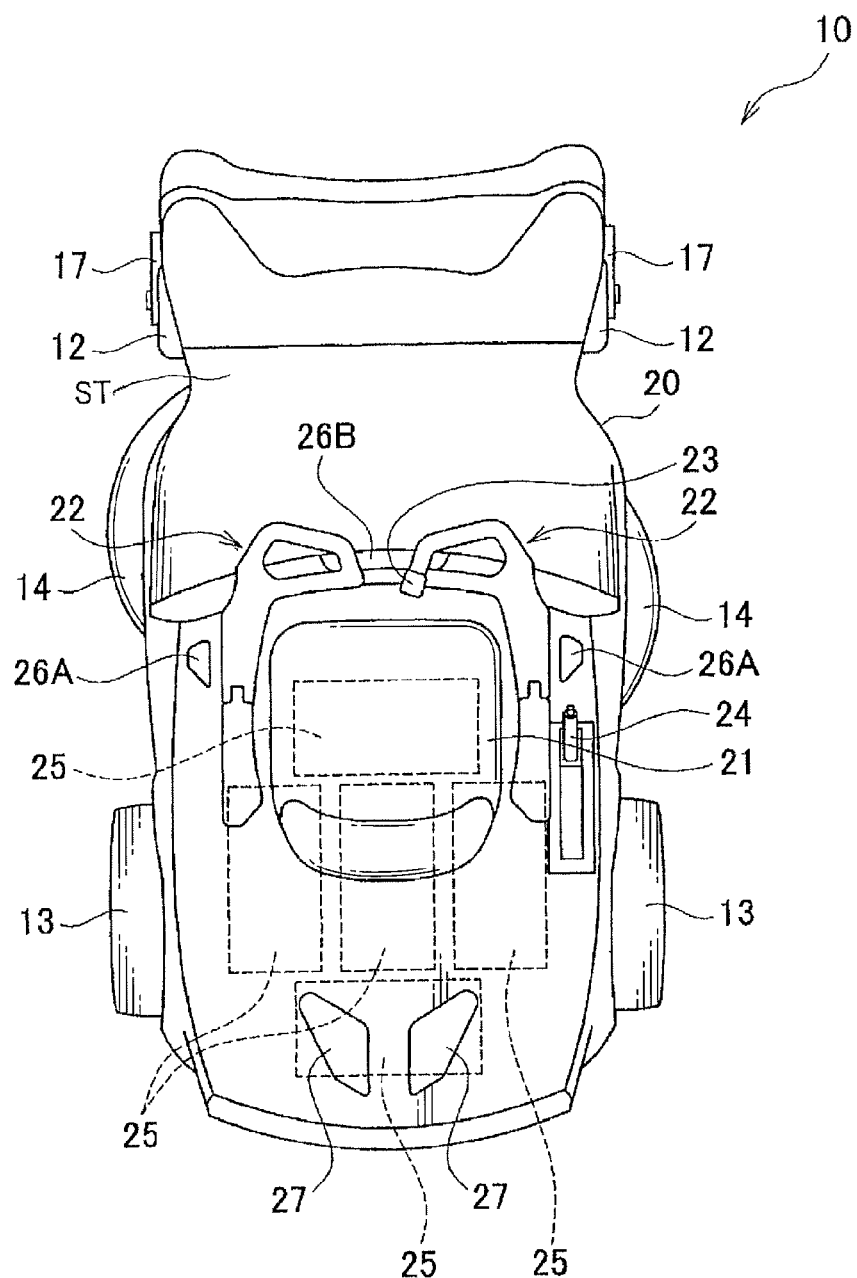
FIG. 2 is a plan view of the electric lawnmower in FIG. 1.

Preferred embodiments of the present invention will be described in detail below with reference to the drawings. FIGS. 1 and 2 respectively illustrate a plan view and a side view of an electric lawnmower 10, which is an example of an electric riding mower according to the present invention. The electric lawnmower 10 includes a pair of frame-like chassis 11 disposed on the left and right sides, a pair of front tires (front wheels) 12 and a pair of rear tires (rear wheels) 13 disposed below the chassis 11. A mower deck 14 is disposed between the front tires 12 and the rear tires 13. The mower deck 14 is shaped like a substantially oval plate with a rim and is disposed with the bottom surface of the plate facing upward. Two mower blades (mowing blades) (not shown) are disposed side by side along the major axis on the inner side of the mower deck 14. Mowing motors 15 and 15 are attached to the centers of rotation of the mower blades. The mower deck 14 is disposed with the minor axis slightly tilted to the right (with respect to the straight-traveling direction of the electric lawnmower 10). That is, the center of rotation of the right mower blade is positioned slightly rearward with respect to that of the left in the straight-traveling direction.

A cowling 20 covers the chassis 11 from above. The cowling 20 covers the entire chassis 11 and is an integrated body made of, for example, reinforced resin or lightweight steel sheet. An operator's seat 21 is disposed on the cowling 20 slightly forward of the rear tires 13. Running operation levers 22 and 22 for running operation of the electric lawnmower 10 are disposed on the left and right sides of the operator's seat 21. A mower-deck adjusting lever 24 for adjusting the height of the mower deck 14 from the ground is disposed on the outer side of the right running operation lever 22. Cooling ports 26A and 26A are formed below the operator's seat 21 on the left and right sides, and a cooling port 26B is formed in front of and below the operator's seat 21. The cooling ports 26A and 26B are openings formed in the cowling 20 for taking in air for cooling batteries 25, which are described below. Two exhaust ports 27 are formed behind the operator's seat 21. The exhaust ports 27 and 27 are openings formed in the cowling 20 for discharging the air taken in from the cooling ports 26A and 26B and through the mower. A step ST for placing one's feet is disposed at in front of the operator's seat 21. The step ST is integrated with the cowling 20.

The electric lawnmower 10 uses electric motors for not only mowing but also for running and has running motors 16 on the inner sides of the paired rear tires 13 and 13. The rear tires 13 and 13 are driven by the running motors 16 (wheel motors may be disposed on the wheels of the rear tires 13 and 13). Thus, the rear tires 13 are driven wheels.

The two mowing motors 15 and two running motors 16 described above achieve high performance by preferably using rare-earth magnets, such as neodymium. Electric power for the mowing motors 15 and the running motors 16 is supplied from the same batteries. Five batteries 25 are horizontally placed inside the cowling 20 below the operator's seat 21 at the rear part of the chassis 11 (the number of batteries 25 is not limited to five). Specifically, three of the batteries 25 are disposed side by side (across the straight-traveling direction of the electric lawnmower 10) between the axles of the rear tires 13 and above the chassis 11. Additional batteries 25 are disposed orthogonally to the three batteries 25, one being in front and another being behind the three batteries 25. Another battery 25 is disposed below the rear part of the chassis 11. Specifically, one of the batteries 25 is disposed behind the rear tires 13 and 13, below the chassis 11, and in a direction orthogonal to the running direction. This battery 25 has the same specification as that of the five batteries 25 described above.

The six batteries 25 are attached with bolts to the chassis 11 using brackets, which are described below. Three of the batteries 25, which are connected in series, constitute a set, and, in this embodiment, two of such sets are provided. Thus, the number of batteries 25 may be three. In such a case, three batteries are disposed side by side above the chassis 11 (across the straight-traveling direction of the electric lawnmower 10). Obviously, in the electric riding mower according to the present invention, the number of the batteries 25 is not restricted, and it is possible to dispose any number of batteries.

The fender of the left rear tire 13 has a power supply port FS for inserting a plug to charge the batteries 25. The power supply port FS is a covered opening in the cowling 20. The power supply port FS has a plug, and the batteries 25 can be charged by plugging in an electric cord connected to a domestic power source when the electric lawnmower 10 is not in operation. An AC adapter, and inverter, and a charging device, etc. are appropriately provided between the batteries 25 and the plug.

A control unit (not shown) is disposed on the batteries 25. The control unit controls the running motors 16 of the electric lawnmower 10. The control unit controls the rotating direction and rotational speed of the running motors 16 in accordance with the amount of tilting (described below) of the running operation levers 22. In addition to the control of the running motors 16, the control unit has roles of controlling the rotation of the mowing motors 15 and correcting minor fluctuations in the voltage of the batteries 25. The rotation of the mowing motors 15 are controlled in cooperation with the rotational speed of the running motors 16. That is, an increase in running speed increases the rotational speed of the mower blades, whereas a decrease in running speed decreases the rotational speed of the mower blades.

The front tires 12 and 12 are rotatably attached to the front tire brackets 17 by shafts. The front tires 12 and 12 are not connected to driving motors and each rotate freely. The front tire brackets 17 are pivotably attached to the chassis 11. The two front tire brackets 17 and 17 each pivot freely.

The running operation levers 22 are tiltably disposed, and when the operator tilts them forward, the running motors 16 rotate in the forward-traveling direction. In contrast, when the running operation levers 22 are tilted rearward, the running motors 16 rotate in the rearward-traveling direction. The rotational speed of the running motors 16 changes in response to the degree of tilting of the running operation levers 22. That is, the running motors 16 rotate fast in the forward-traveling (rearward-traveling) direction when the running operation levers 22 are tilted forward (rearward) by a large amount, whereas the running motors 16 rotate slow in the forward-traveling (rearward-traveling) direction when the running operation levers 22 is tilted forward (rearward) by a small amount. Among operations of the running operation levers 22 and 22 disposed on the left and right sides of the operator's seat 21, operation of the right running operation lever 22 rotates the motor of the right rear tire 13, and operation of the left running operation lever 22 rotates the motor of the left rear tire 13. By appropriately operating the left and right running operation levers 22 and 22 in the forward and rearward directions, the operator can operate the electric lawnmower 10 to travel straight forward or rearward, turn left or right, or turn in circles.

On the right running operation lever 22, a mower-blade switch 23 for turning on/off the rotation of the two mower blades in the mower deck 14 adjoins the grip part. The mower-blade switch 23 is a limit-type switch and turns on when the operator pushes it with his or her finger and turns off when pushed again.

One end of a deck support arm 18 for lifting/lowering the mower deck 14 is pivotably attached to substantially the center of the left chassis 11. The other end of the deck support arm 18 is attached to the mower deck 14 with a stay 19a (19a' is on the back side of FIG. 1). The stay 19a is fixed to the surface of the mower deck 14 by, for example, welding. The deck support arm 18 is pivotably attached to the stay 19a. The pivot center of the deck support arm 18 is the connecting part with the chassis 11. The deck support arm 18 is connected to the mower-deck adjusting lever 24 with a link mechanism (not shown). Another stay 19b (19b' is on the back side of FIG. 1) is fixed to the front side of the mower deck 14. One end of a shaft S is pivotably attached to the stay 19b. The other end of the shaft S is pivotably attached to the chassis 11 with another stay (not shown).

Figure 3:
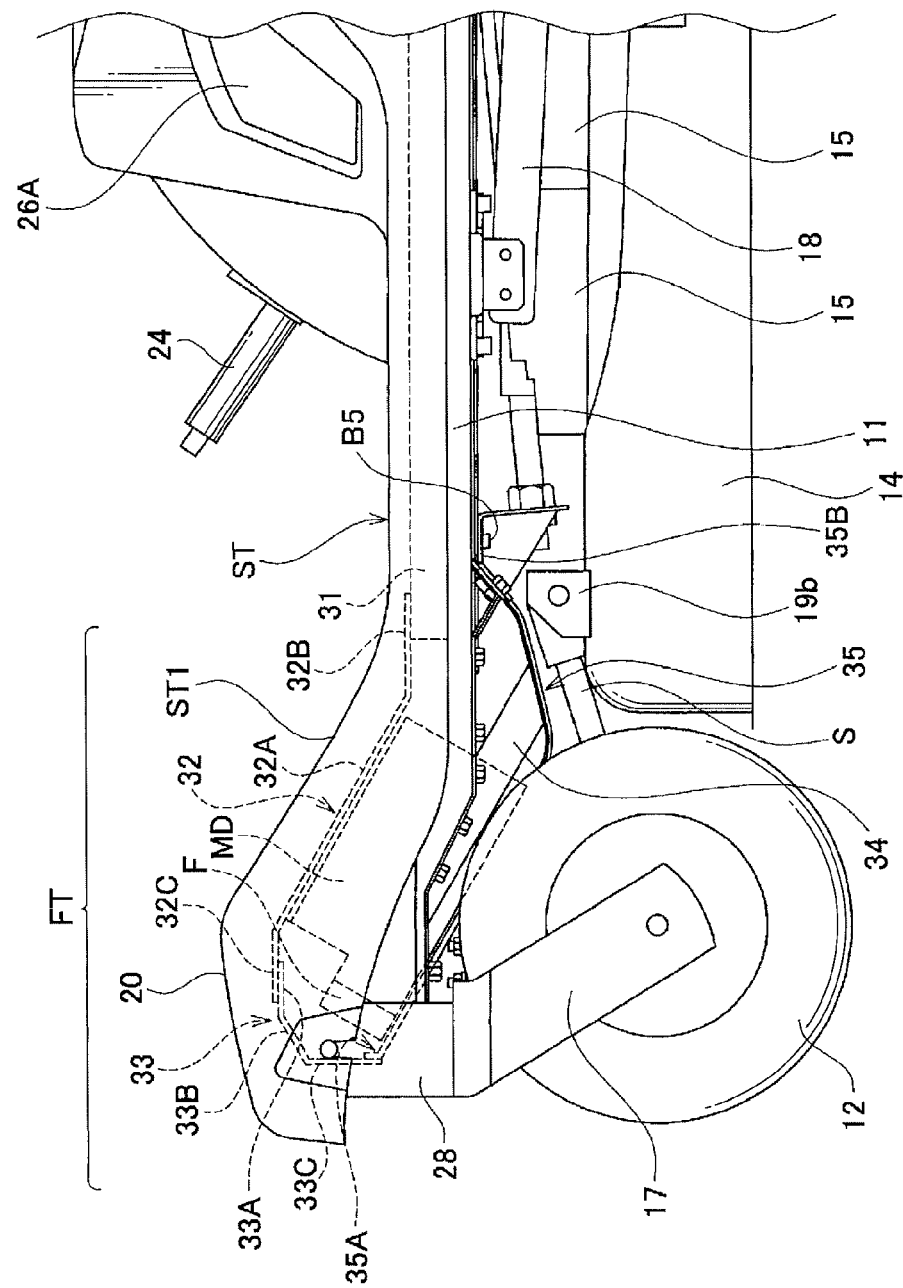
FIG. 3 is an enlarged view of essential parts in FIG. 1.
Figure 4:
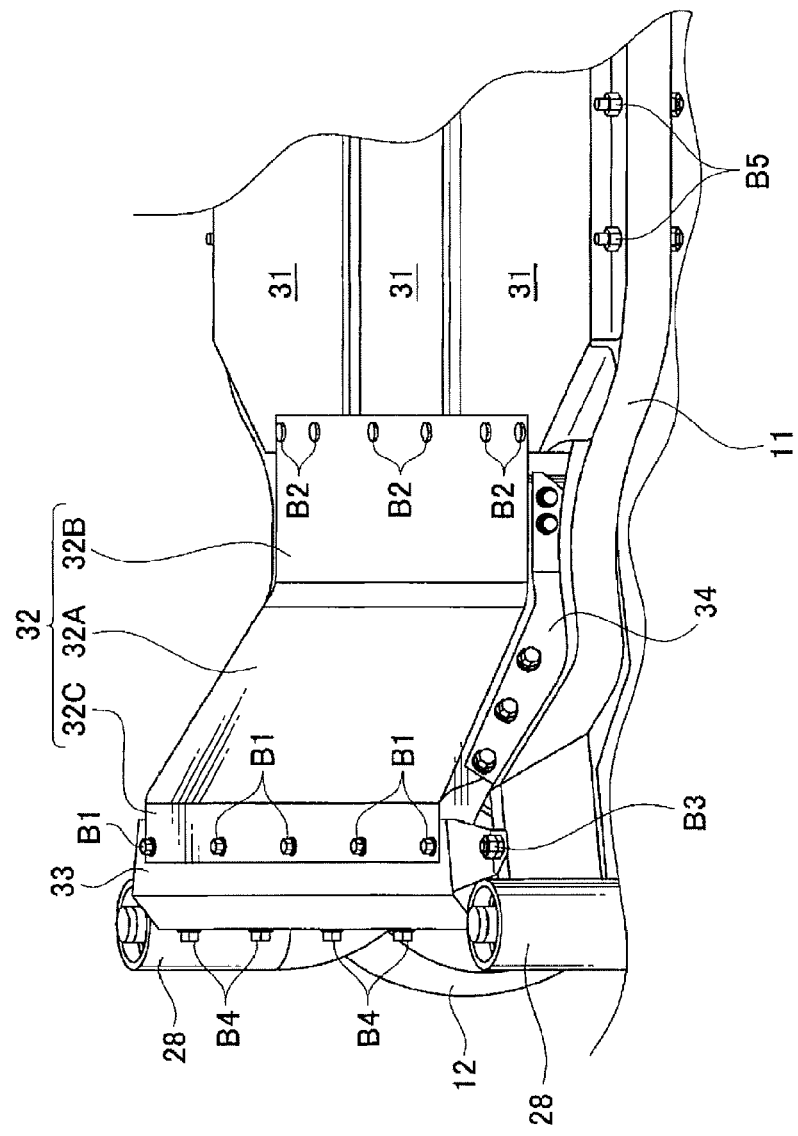
FIG. 4 is an enlarged perspective view of the front part of the electric lawnmower.
Figure 5:
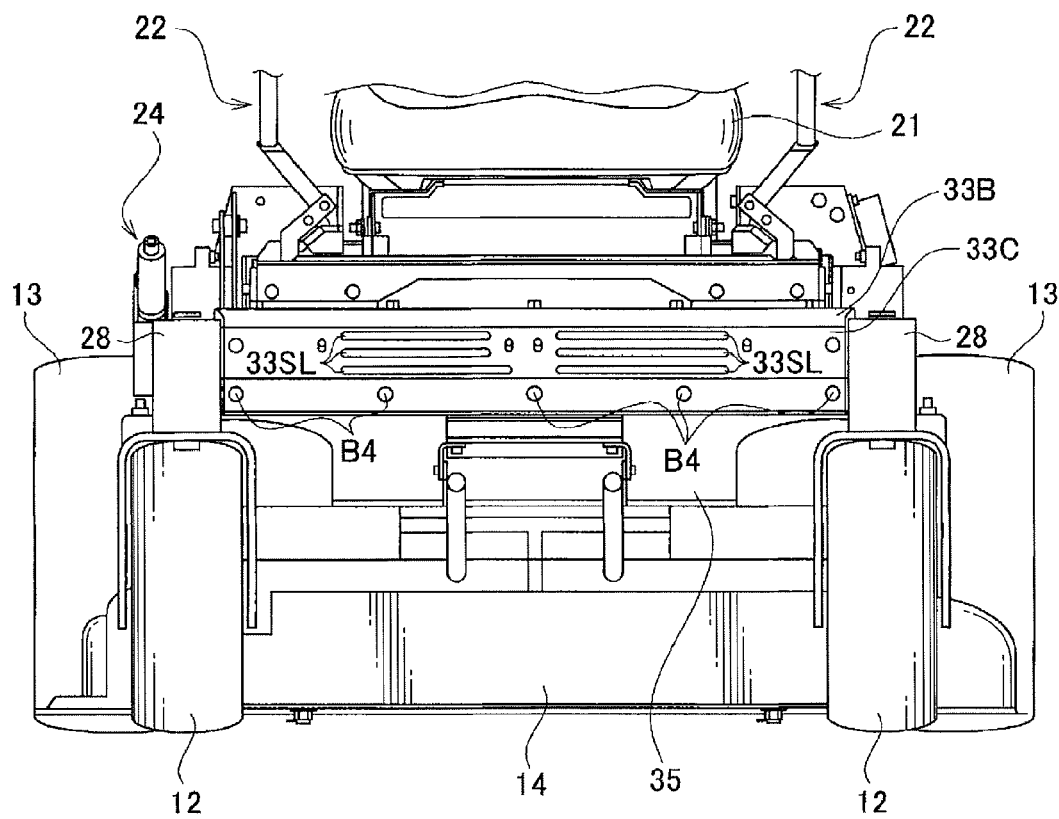
FIG. 5 is an enlarged front view of part of the electric lawnmower.
Figure 6:
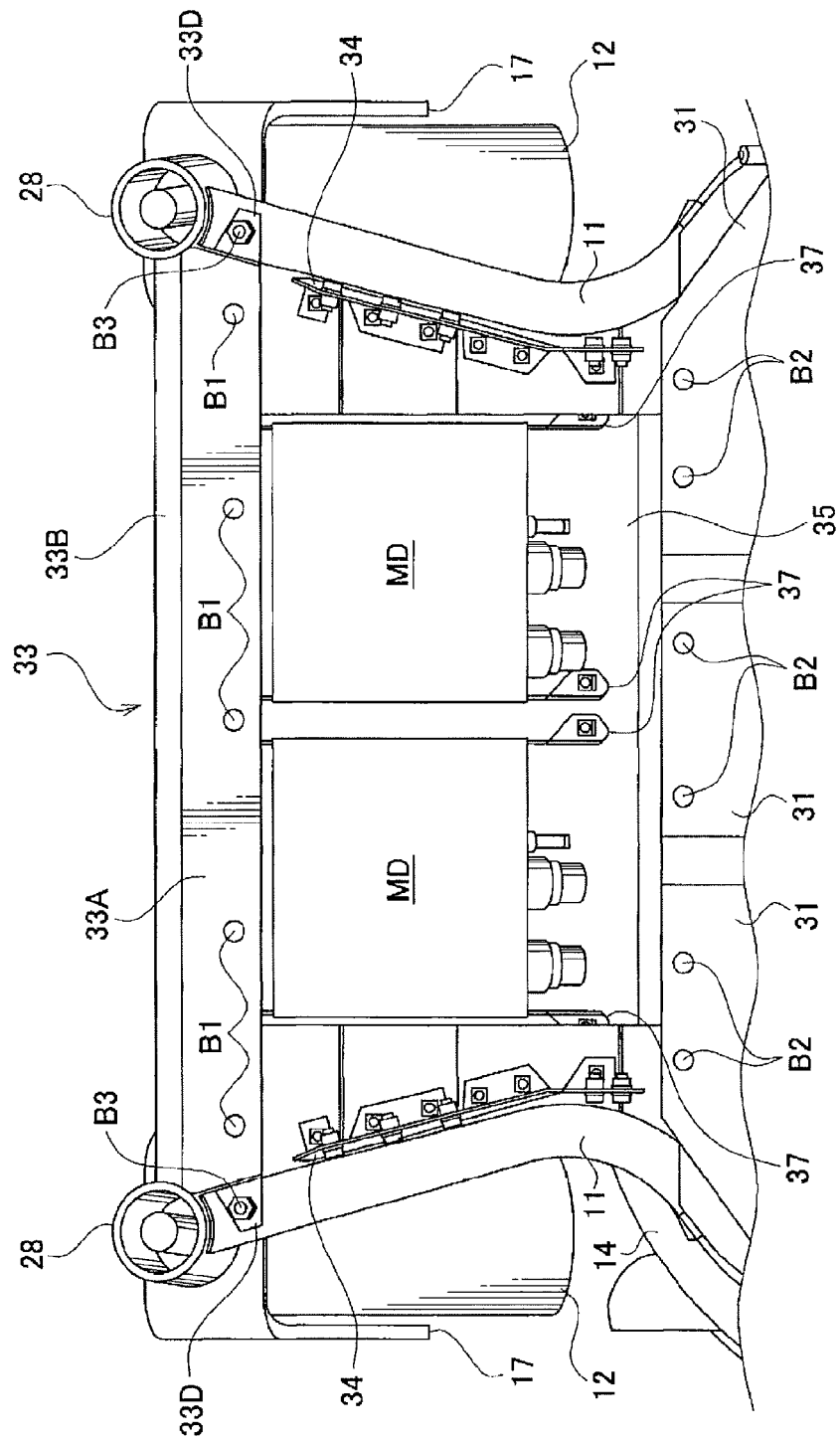
FIG. 6 is an enlarged plan view of the front part of the electric lawnmower.

FIGS. 3 to 6 illustrate essential parts of this embodiment. FIG. 3 is a partially enlarged view of FIG. 1; FIG. 4 is the same as FIG. 3 but with the cowling 20 removed; FIG. 5 is a front view of the electric lawnmower 10 in the state illustrated in FIG. 4; and FIG. 6 is a diagram the same as FIG. 4 but with an upper-surface part 32 removed.

Two mower-motor drivers MD and MD for drive control of the mowing motors 15 and 15 are disposed inside a front end part FT of the body of the electric lawnmower 10. Specifically, the front end parts (i.e., the front end part FT of the electric lawnmower 10) of the paired chassis 11 and 11 are formed with a forward (in a forward-traveling direction of the electric lawnmower 10) and upward inclination, and a driver storage part is disposed between the chassis 11 and 11 in this area. The driver storage part is constituted of the upper-surface part 32, a front-surface part 33, a bottom part 35, and side parts 34. The left and right mower-motor drivers MD and MD correspond to the left and right mowing motors 15 and 15, respectively (i.e., the left and right mower blades).

The upper-surface part 32 is constituted of three parts by bending a rectangular iron plate in a mountain fold and a valley fold. The three parts include a front part 32A, a rear part 32B, and a front end part 32C. The front end part 32C has through-holes and is fixed to the front-surface part 33 with bolts B1. The rear part 32B has through-holes and is fixed to a deck panel 31 with bolts B2. The deck panel 31 is constituted of three parts, i.e., left part, center part, and right part, which are connected with bolts. The deck panel 31 is bridged across the chassis 11 and 11 and is fixed to the chassis 11 and 11 with bolts B5. The front part 32A of the upper-surface part 32 is bent obliquely forward (forward-traveling direction of the electric lawnmower 10) (to the rear part 32B) along the shape of the chassis 11.

The front-surface part 33, which is made of iron, is bent in two steps in a longitudinal sectional view, forming a top surface 33A, an intermediate surface 33B, and a front surface 33C. The front-surface part 33 extends along the width direction (of the electric lawnmower 10), and the front surface 33C has slits (air intake parts), which are described below. The front-surface part 33 is integrated with attachment parts 33D and 33D on both sides in the width direction. The attachment parts 33D have through-holes and are fixed to the upper surface at the front ends of the chassis 11 with bolts B3. The front surface 33C has through-holes and is fixed to an attachment flap (described below) at the front end of the bottom part 35 with bolts B4. The front-surface part 33 is interposed between front poles 28 and 28, which rotatably support the tire brackets 17 and 17. The front ends of the chassis 11 are fixed to the side surfaces of the front poles 28, which are iron cylinders. Fixing pins protrude from the upper parts of the side surfaces to which the edge of the cowling 20 are pivotably hooked.

The bottom part 35 is a rectangular iron plate bent at the center part and has an attachment flap 35A, which is an attachment margin formed by bending the front edge, and an attachment flat 35B, which is an attachment margin formed by bending the rear edge. The attachment flap 35A has through-holes and is attached to the front-surface part 33 with the bolts B4. The attachment flat 35B has through-holes and is attached to the bottom surface of the chassis 11 with the bolts B5.

The side parts 34 are made of an iron plate and are interposed between the upper-surface part 32 and the bottom part 35.

Figure 7:
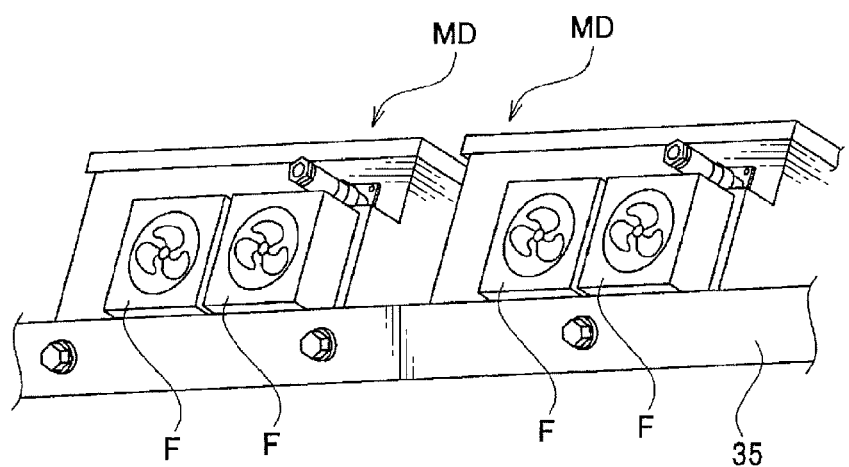
FIG. 7 is a perspective view of a mower-motor driver and a fan for cooling thereof.

The mower-motor drivers MD are placed on the bottom panel 35, and the sides thereof are fixed by fixing plates 37 and 37. The mower-motor drivers MD are disposed obliquely upward in the forward-traveling direction of the electric lawnmower 10 at a predetermined angle α to a horizontal plane (that is, the bottom part 35, which is the area where the mower-motor drivers MD are place, is formed with an upward inclination by an angle α to a horizontal plane, where the angle α is substantially the same as the angle of forward and upward inclination of the chassis 11 at the front end part FT). Fans F for cooling the mower-motor drivers MD are amounted with bolts to the front surfaces of the mower-motor drivers MD (FIG. 7).

A step ST, which is integrated with the cowling 20, is provided for placing the feet of the operator sitting in the operator's seat 21 (the step ST is also for placing the operator's foot when getting on/off the electric lawnmower 10).

The cowling 20 covers the chassis 11 and 11 from above, and the step ST is provided in the front area of the electric lawnmower 10. Thus, a front end part ST1 of the step ST is formed with a forward and upward (obliquely forward) inclination in such a manner that it follows the forward and upward (obliquely forward) inclination of the chassis 11 in the front end part FT of the electric lawnmower 10. That is, since the surface of the front end part ST1 of the step ST is formed with an inclination toward the operator's seat 21, when the operator sits in the operator's seat 21, his or her feet can be comfortably placed on the front end part ST1 of the step ST.

Figure 8A:
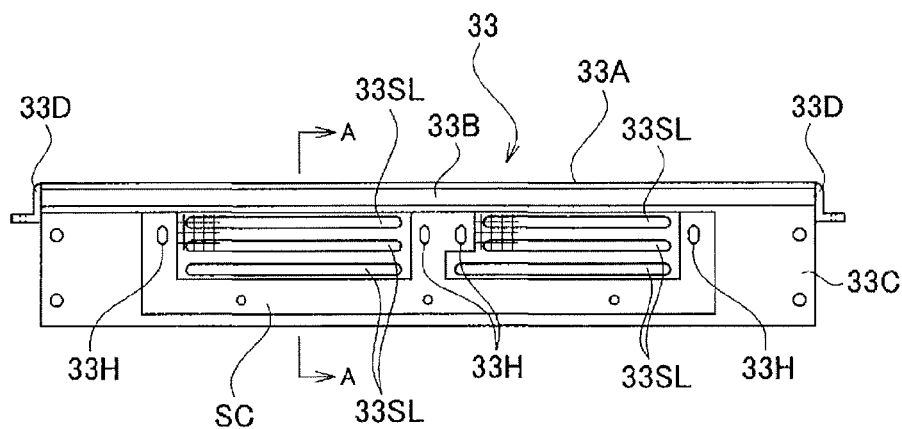
FIG. 8(a) is a back view.
Figure 8B:
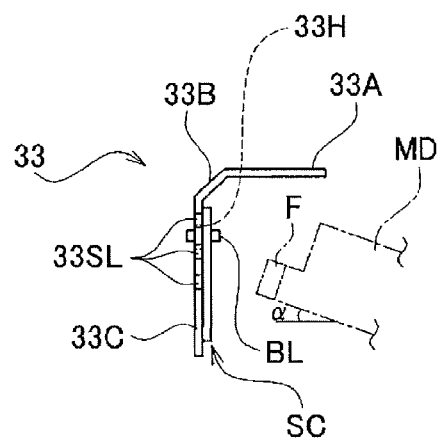
FIG. 8(b) is a sectional view taken along arrow A.
Figure 8C:
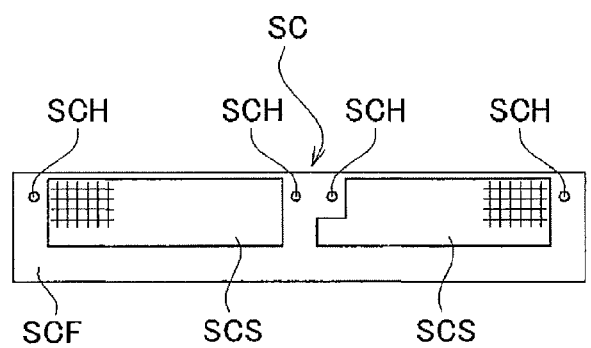
FIG. 8(c) is a front view of a screen attached to the front surface part.

FIG. 8 illustrates details of the front-surface part 33. Three slits (air intake parts) 33SL for taking in external air are formed on each of the left and right sides. A screen SC is attached on the back side of the front surface 33C to cover the slits 33SL. The screen SC prevents the intrusion of mowed grass and dirt when air is taken in through the slits 33SL and includes a frame part SCF and nets SCS attached to the inner side thereof. Through-holes SCH are formed in the frame part SCF, and long holes 33H are formed in the front surface 33C of the front-surface part 33 to detachably fix these together with bolts BT.

The slits 33SL are formed in the front surface 33C, which extends in substantially the vertical direction, such that the fans F can easily take in external air. Both are disposed closely to each other such that the fans F can efficiently take in external air.

Figure 9:
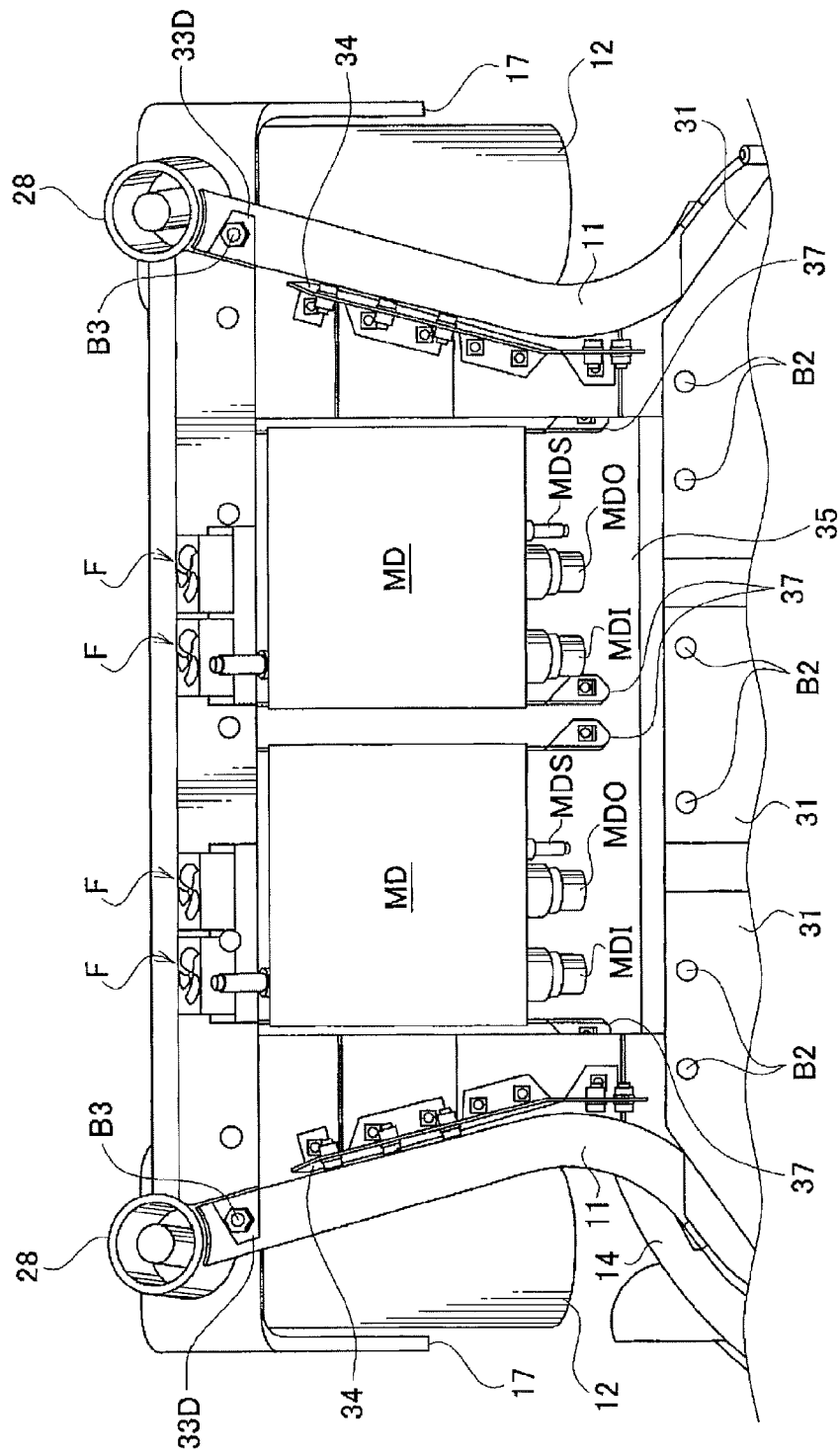
FIG. 9 is an enlarged plan view of essential parts illustrating the layout of the mower-motor driver and the fan.

In FIG. 9, the reference characters MDI represent power input terminals from the batteries 25 to the mower-motor drivers MD, reference characters MDO represent power output terminals from the mower-motor drivers MD to the mowing motors 15, and the reference characters MDS represent input signal terminals from the controller.

The fans F are configured to start rotating when the mower-blade switch 23 provided on the corresponding running operation lever 22 is turned on and to stop rotating when the mower-blade switch is turned off.

To carrying out mowing with the electric lawnmower 10 having such a configuration, the operator turns on the mower-blade switch 23 provided on the corresponding running operation levers 22. In response, the two mowing motors 15 rotate, and the driving force thereof rotates the two mower blades. By turning on the mower-blade switch 23, the fans F of the mower-motor drivers MD also rotate to take in external air to the mower-motor drivers MD through the slits 33SL. Then, the running operation levers 22 are appropriately operated to run the electric lawnmower 10. By running the electric lawnmower 10, external air can be taken in even more, and the mower-motor drivers MD can be cooled even more efficiently.

Once mowing is started, small pieces of grass (scattered objects) are tossed into the air by the mower blades, and part of these reaches the slits 33SL in front of the mower blades. Since the slits 33SL are sucked inward from inside of the front-surface part 33 due to the operation of the fans F, small pieces of grass and dust floating in the air (scattered objects) are likely to reach the slits 33SL. Intrusion of such small pieces of grass and dust that reach the slits 33SL to the driver storage part is prevented by the screen SC.

To stop mowing, the mower-blade switch 23 provided on the corresponding running operation lever 22 is turned off. In cooperation with this, the rotation of the fans F stops, and air sent to the mower-motor drivers MD is stopped.

In the embodiment described above, the chassis 11 are disposed with a forward and upward inclination by an angle α at the front end part FT, and, along this, the bottom part 35 in the area where the mower-motor drivers MD are placed is formed with an obliquely upward inclination by an angle α to a horizontal plane. The present invention, however, is not limited thereto, and the front end part FT of the chassis 11 may be formed horizontally. To match this, the bottom part 35 in the area where the mower-motor drivers MD are placed may be formed horizontally, and the mower-motor drivers MD may be disposed horizontally.

In the embodiment described above, the fans F are disposed behind the slits 33SL to support the intake of external air to the mower-motor drivers MD. The present invention, however, is not limited thereto. Since the slits 33SL are formed in the foremost surface of the electric lawnmower 10, external air can be taken in suitably as the electric lawnmower 10 runs. Thus, the mower-motor drivers MD may be cooled without the fans F and by taking in external air through the slits 33SL.

In the embodiment described above, the screen SC is disposed on the back side of the slits 33SL to prevent the intrusion of dust and mowed grass contained in the external air through the slits 33SL. The present invention, however, is not limited thereto, and a screen may not be provided. The slits may be designed with appropriately decreased opening widths in the vertical direction to reduce intrusion of dust, etc.

In the embodiment described above, the mower-blade switch 23 is provided only on the right running operation lever 22, and by turning turned on/off the mower-blade switch 23, the two mower blades are simultaneously turned on/off. The present invention, however, is not limited thereto, and instead, both the left and right running operation levers 22 and 22 may have mower-blade switches 23, the mower-blade switch 23 on the right running operation lever 22 turning on/off the right mower blade, the mower-blade switch 23 on the left running operation lever 22 turning on/off the left mower blade. In such a case, turning on/off the mower-blade switch 23 on the right running operation lever 22 rotates the fans F of the mower-motor driver MD that control the rotation of the right mowing motor 15, and turning on/off the mower-blade switch 23 provided on the left running operation lever 22 rotates the fans F of the mower-motor driver MD that control the rotation of the left mowing motor 15.

Figure 10:
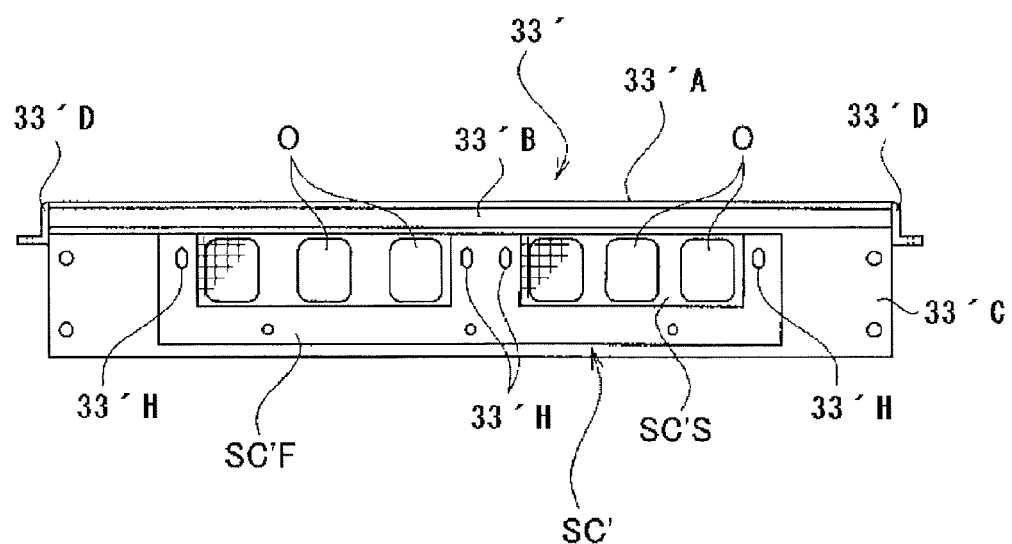
FIG. 10 is a back view of the front surface part of an electric lawnmower according to another embodiment of the present invention.

In addition, as illustrated in FIG. 10, openings O, which are air intake parts, may be formed in the front-surface part 33', instead of slits. In this embodiment, the shape of the openings O is a rectangle, but the shape is not limited thereto and may be a circle, an oval, or any other shape. A screen SC' is attached to the back side of the front-surface part 33' to cover the openings O. Reference characters 33'A, 33'B, and 33'C respectively represent a top surface, an intermediate surface, and a front surface. Reference characters 33'H represent long holes, and reference characters 33'D represent attachment parts. The screen SC' includes a frame part SC'F and nets SC'S. Through-holes formed in the frame part SC'F are aligned with long holes 33'H formed in the front surface 33'C, and bolts are passed therethrough to attach the screen SC' to the front-surface part 33'. The front-surface part 33' is attached to the chassis 11 with bolts with the attachment parts 33'D.

The mower-motor drivers MD may not be disposed along a horizontal plane. In such a case, the front end parts of the chassis are formed horizontally without a forward (forward-traveling direction of the electric lawnmower 10) and upward inclination, and the driver storage part is horizontally disposed between the paired chassis. In this way, the air intake part formed on the front-surface part, which constitutes the driver storage part, and the front surfaces of the mower-motor drivers MD (and/or the fans disposed on the front surfaces of the mower-motor drivers) are arranged parallel to and facing each other. As a result, external air can be taken in efficiently, and the mower-motor drivers MD can be efficiently cooled.

Figure 11:
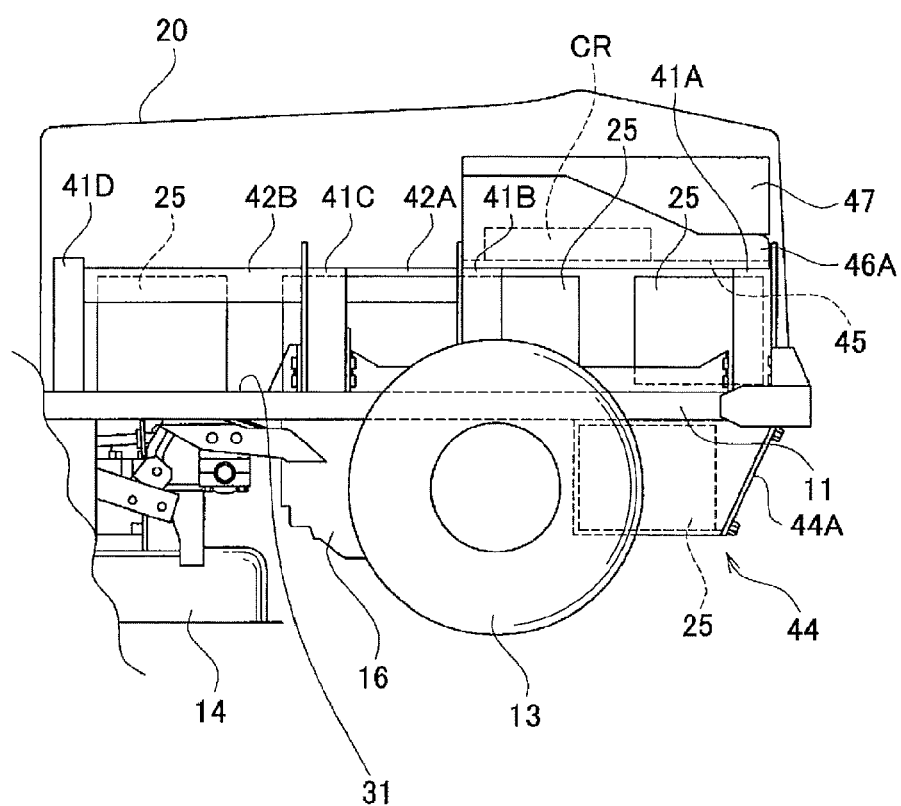
FIG. 11 is a side view of part of the electric lawnmower.
Figure 12:
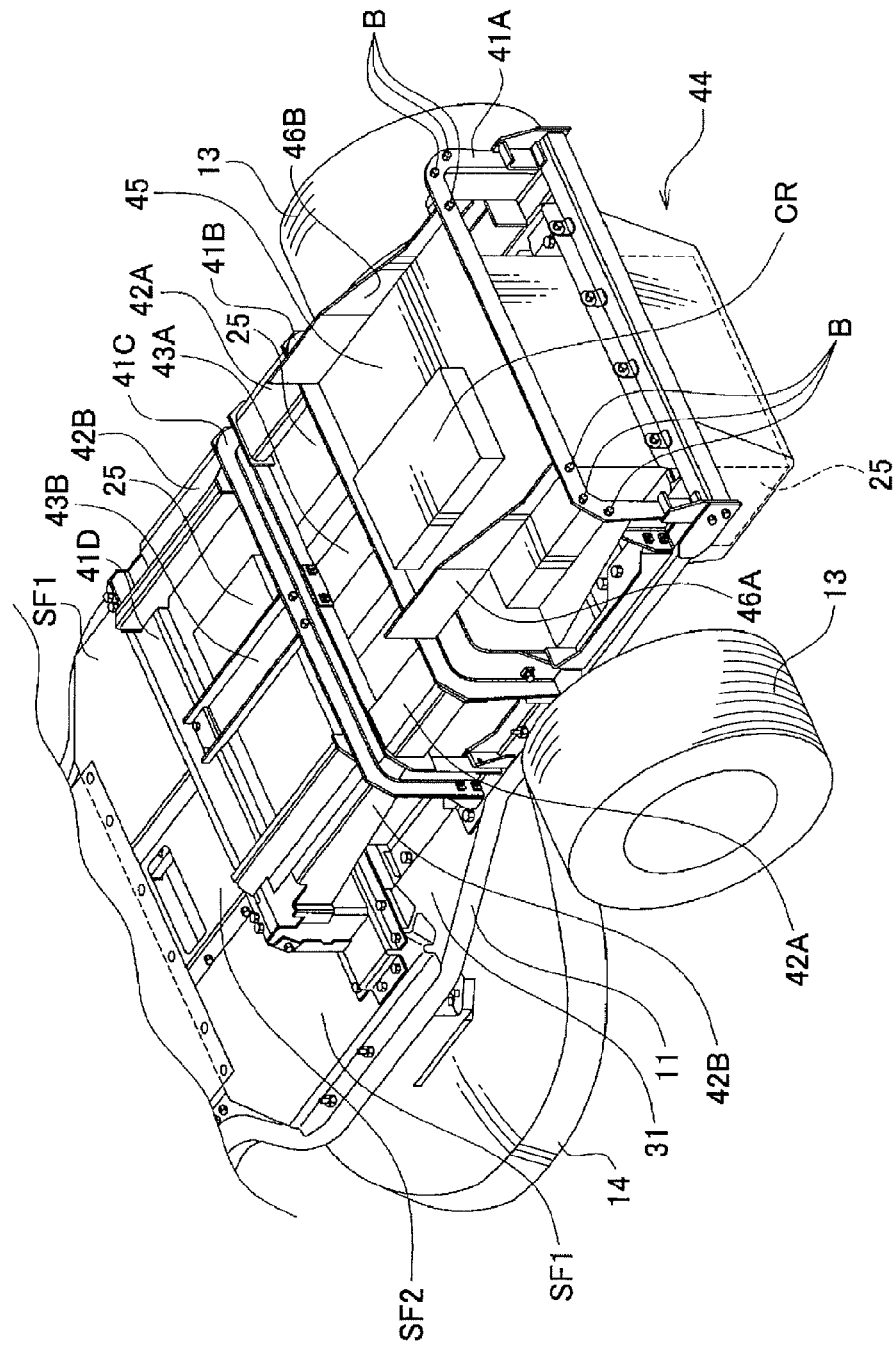
FIG. 12 is a perspective view of part of the electric lawnmower.

FIGS. 11 and 12 illustrate details of the layout of the batteries 25. The five batteries 25 are horizontally disposed on the deck panel 31, which is fixed to the upper surfaces of the chassis 11, and are fixed with bolts. It is preferable to use lithium ion batteries as the batteries 25. Specifically, it is desirable to use batteries having a high energy density and a long life, such as lithium-manganese dioxide batteries, graphite-lithium fluoride batteries, lithium-thionyl chloride batteries, lithium-copper oxide batteries, lithium-iron disulfide batteries, and iodine-lithium batteries.

Rectangular arch-shaped protective frames 41A, 41B, 41C, and 41D are disposed above and cover the five batteries 25. Base ends of the protective frames 41A to 41D are fixed to the left and right chassis 11 and 11 with bolts. Reinforcement panels 42A and 42A, which are disposed on both sides, along the chassis 11 and 11, and a reinforcement panel 43A, which is disposed at the center, are bridged across the protective frame 41B and the protective frame 41C, and the base ends thereof are fixed to the protective frame 41B and the protective frame 41C with bolts. Reinforcement panels 42B and 42B, which are disposed along the chassis 11 and 11, and a reinforcement panel 43B, which is disposed at the center, are bridged across the protective frame 41C and the protective frame 41D, and the base ends thereof are fixed to the protective frame 41C and the protective frame 41D with bolts.

A battery controller CR for voltage control of the batteries 25 is disposed above the batteries 25. Specifically, iron sidewall members 46A and 46B, which are disposed on both sides of the electric lawnmower 10 in the forward-traveling direction, are bridged across the protective frames 41A and 41B, and the front and rear edges thereof are fixed to the side parts of the protective frames 41A and 41B with the bolts B. An iron mounting plate 45 covers a rectangular space defined by the protective frames 41A and 41B and the iron sidewall members 46A and 46B and is fixed to the protective frames 41A and 41B with bolts. The battery controller CR, which is covered with a cubical case, is fixed on the mounting panel 45 with bolts (the battery controller CR is approximately 400 mm in length, 300 mm in width, and 100 mm in height). A cover 47 covers the mounting panel 45 from above. The cover 47 is made of iron and has a bottom formed along the upper edges of the iron sidewall members 46A and 46B. Since the cover 47 is provided, the battery controller CR is not exposed when the cowling 20 is opened, as described below, and thus, the battery controller CR can be protected from unexpected falling objects.

A battery case 44 is fixed below the rear part of the chassis 11 with bolts. One of the batteries 25 is fixed inside the battery case 44 with bolts. An opening/closing lid 44A for removing the battery 25 is fixed on the battery case 44.

Figure 13:
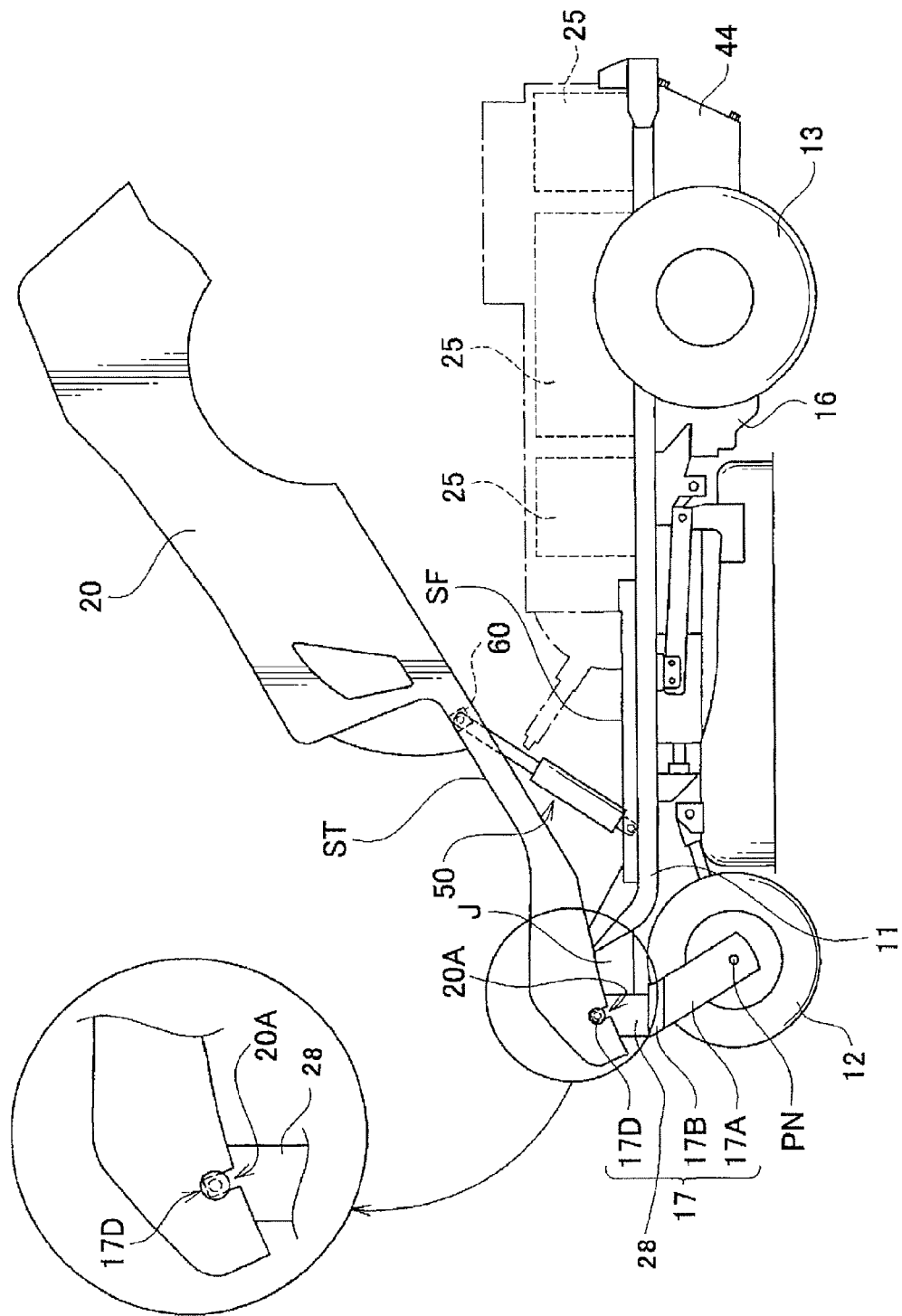
FIG. 13 is a side view of a cowling pivoted and a battery controller exposed.

As illustrated in FIG. 13, notches 20A are formed on both sides of the front end part of the cowling 20. Flat-head pins 17D and 17D are fixed to the front tire brackets 17 and 17. The front tire brackets 17 each include a front-tire supporting part 17A, a front pole 28, and a connecting part 17B, which pivotably connects these. The front-tire supporting part 17A is made of an iron plate having a gate shape in a sectional view, and through-holes through which pins PN are passed are formed in both end parts to pivotably attach the front tire 12. The front pole 28 is constituted of an iron cylinder and has a connecting plate J welded to the lower side surface thereof. The connecting plate J is fixed to the end part of the chassis 11. Thus, the front-tire supporting part 17A is pivotable on the horizontal plane, but the front pole 28 does not pivot. The flat-head pins 17D protrude from the upper side surfaces of the front poles 28 (outer sides of the electric lawnmower 10 in the running direction). The flat-head pins 17D each constitute a stopper by having a flat plate fixed to a tip of a rod-like pin, where the diameter of the flat plate is larger than the pin.

The notches 20A in the cowling 20 hook to the flat-head pins 17D (in this way, the cowling 20 is pivotable upward with the front of the chassis 11 serving as the pivot support point). Dampers 50 are attached between a step supporting panel SF mounted on the chassis 11 and the back surface of the cowling 20. Two dampers 50 are disposed side by side in the width direction of the electric lawnmower 10.

Figure 14A:
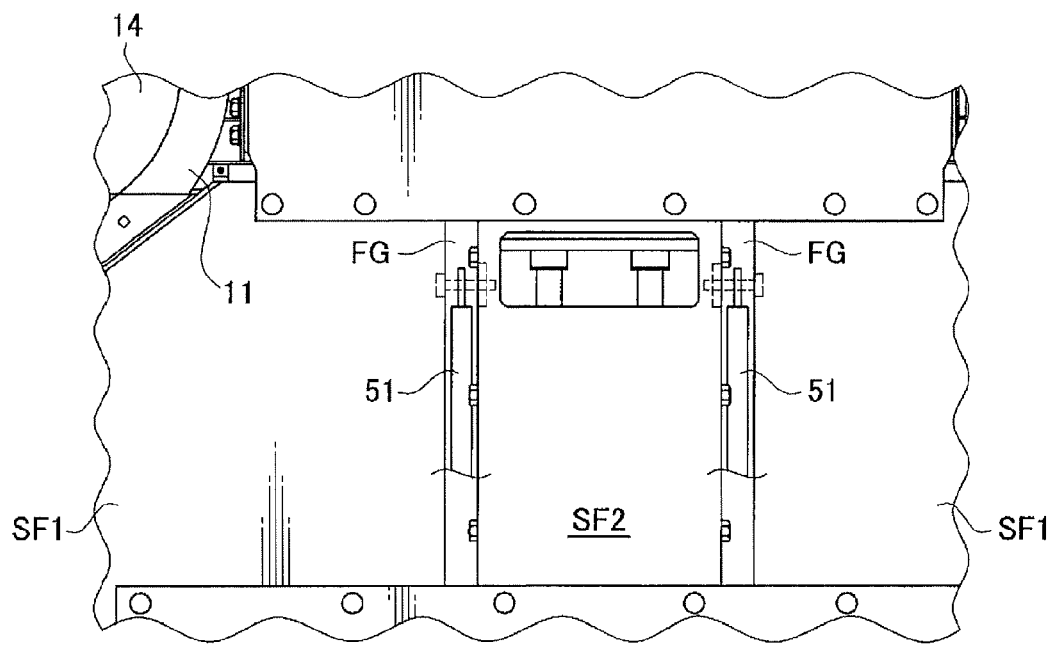
FIG. 14(a) is a schematic plan view of essential parts of a step support panel.
Figure 14B:
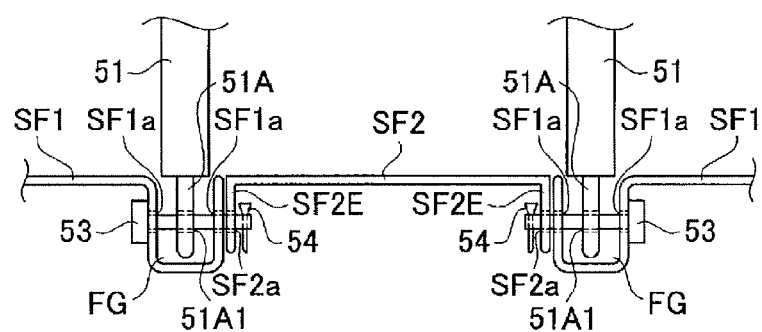
FIG. 14(b) is a side view of dampers attached to the step support panel.
Figure 14C:
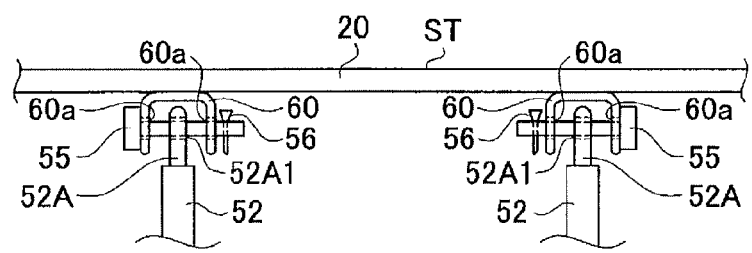
FIG. 14(c) is a side of the dampers attached to a back side of the cowling.

As illustrated in FIGS. 14(a) to 14(c), the dampers 50 each include a damper main body 51, which has a spring function, and a damper rod 52, which protrudes/retracts from/to the inside of the damper main body 51 (as the dampers 50, known air spring type or oil spring type dampers may be appropriately used). A connecting part 51A is fixed to the tip of the damper main body 51. The tip of the connecting part 51A is a rounded iron plate, and a through-hole 51A1 is formed in the center part. A connecting part 52A is fixed to the tip of the damper rod 52. The tip of the connecting part 52A is a rounded iron plate, and a through-hole 52A1 is formed in the center part.

The step supporting panel SF is constituted of three parts in the width direction of the electric lawnmower 10. That is, side panels SF1 and SF1 are disposed on the left and right sides; a center panel SF2 is disposed between the two side panels SF1; and the three panels are connected with bolts. Each side panel SF1 is made of an iron plate, and one of the edge parts is bent in a U-shape to form a groove FG. Through-holes for connecting the center panel SF2 are formed in the edges of the U-shaped groove FG. Other through-holes SF1a and SF1a are formed on both walls of the groove FG. The center panel SF2 is made of an iron plate, and both side edge parts are bent at a downward right angle to configure side edge parts SF2E and SF2E. The side edge parts SF2E each have a through-hole SF2a.

The connecting part 51A of the damper main body 51 is inserted into the groove FG of the side panel SF1; a bolt 53 is passed through one of the through-holes SF1a, the through-hole 51A1, the other through-hole SF1a, and the through-hole SF2a, in this order; and then, a pin 54 is passed through the tip of the bolt 53 as a stopper. In this way, the damper main body 51 is pivotably attached to the step supporting panel SF.

Cowling-damper connecting devices 60 are fixed to the back surface of the cowling 20 with bolts. The cowling-damper connecting devices 60 are each constituted of a rectangular iron piece bent in a U-shape, and through-holes 60a and 60a are formed on both side parts thereof. Another through-hole is formed in the center part bent in a U-shape for attachment to the cowling 20 with a bolt (in this embodiment, the attachment area of the cowling-damper connecting devices 60 on the cowling 20 is provided at the side edge parts of the step ST near operator's seat 21 but is not limited thereto, and attachment is possible at any positions required depending on the circumstances).

The connecting part 52A of the damper rod 52 is inserted into the U-shaped part of the cowling-damper connecting device 60; a bolt 55 is inserted into one of the through-holes 60a, the through-hole 52A1, and the other through-hole 60a, in this order; and then, a pin 56 is passed through the tip of the bolt 55 as a stopper. In this way, the damper rod 52 is pivotably attached to the back surface of the cowling 20.

By opening the cowling 20, the battery controller CR and the five batteries 25 horizontally placed on the deck panel 31 can be removed.

Figure 15:
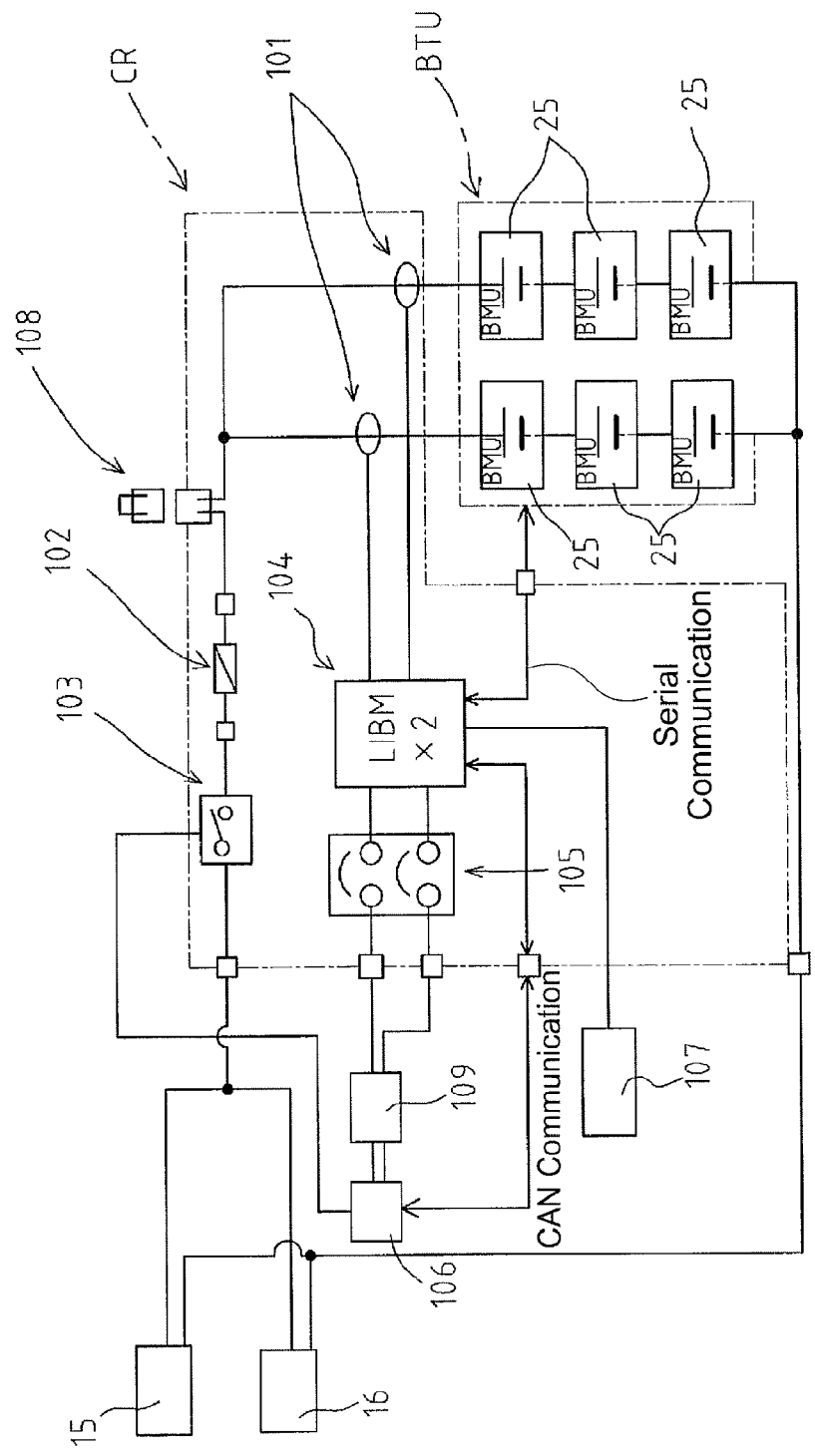
FIG. 15 is a circuit diagram of the battery controller.
Figure 16:
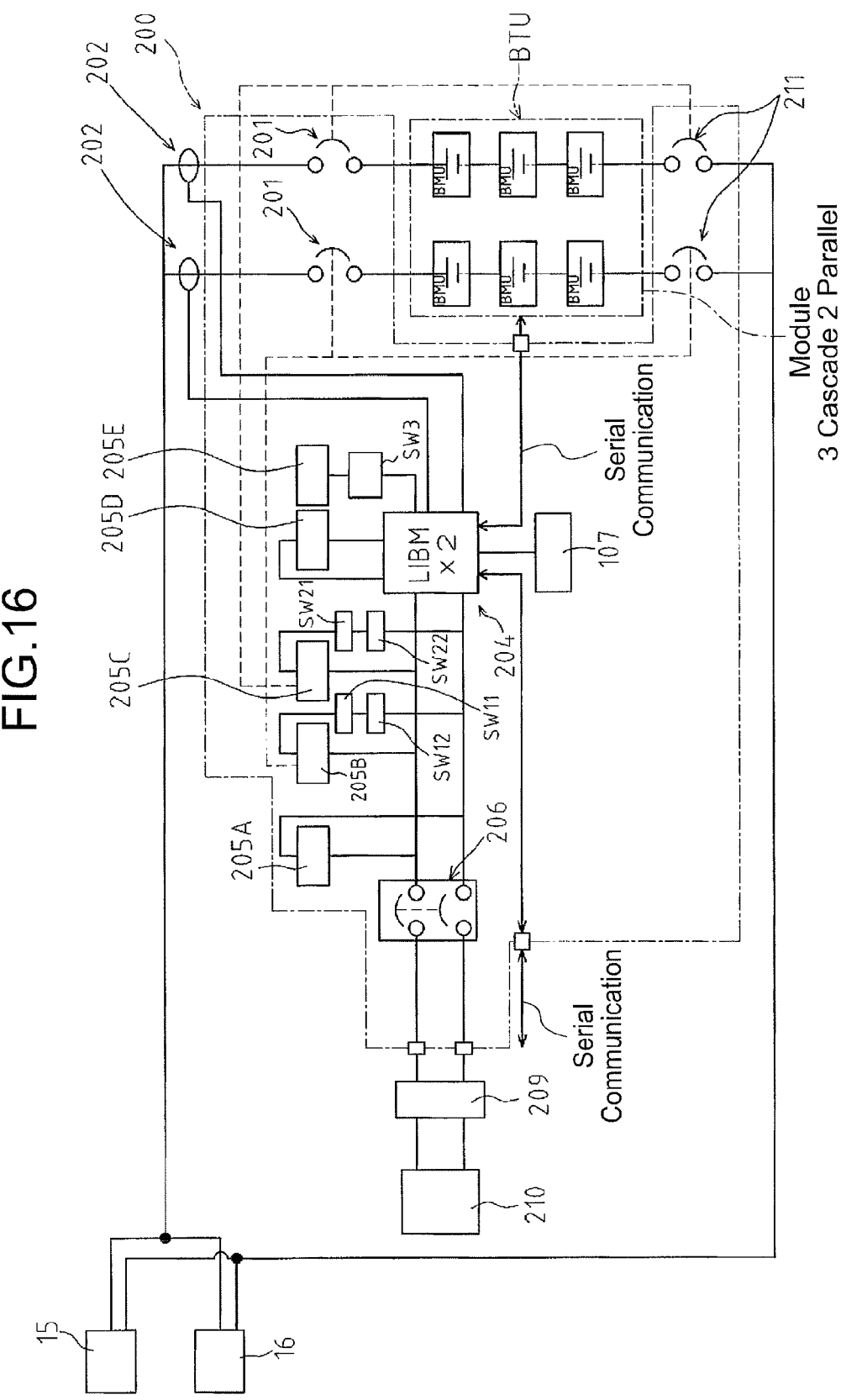
FIG. 16 is an example circuit diagram of a known battery controller.

FIG. 15 is a circuit diagram of the battery controller CR of the electric lawnmower 10 according to this embodiment. A battery unit BTU includes two parallel-connected sets of three series-connected batteries 25 (where the terminal voltage is 72 V). Current sensors 101 and 101 are connected to the two positive poles of the battery unit BTU and are then linked together. A delay fuse 102 is attached via a safety plug 108 (the safety plug 108 allows the battery controller CR to be safely removed/attached). An EV (electric vehicle) relay (current interrupting means) 103 is disposed downstream of the delay fuse 102. Two wires branch off to the outside of the battery controller CR; one of the wires, which is the positive pole of the 72-V driving power source, is connected to a relay, the motor drivers, and the mowing motors 15, in this order, and the other wire is connected to a relay, the motor driver, and the running motors 16, in this order. The negative poles of the battery unit BTU are also linked to a relay provided outside the battery controller CR and are connected to the mowing motors 15 and the running motors 16.

Wires branching off the current sensors 101 and 101 are connected to battery control substrates 104 and 104. Breakers 105 and 105 are connected to the positive and negative poles downstream of the battery control substrates 104. The breakers 105 and 105 are connected to a DC-to-DC converter 109 outside the battery controller CR, are reduced to 12 V to serve as a control power source, and are connected to a system controller 106. The system controller 106 controls the running operation levers 22, input units, such as various switches, and output units, such as electromagnetic brakes and various lamps. The system controller 106 is connected to the relay 103 and disconnects/connects the relay 103.

The battery control substrates 104 carry out serial communication with the battery unit BTU and monitor voltage fluctuation, etc. of the battery unit BTU. The battery control substrates 104 can carry out CAN (control area network) communication with another system controller 106 that is disposed at another location on the electric lawnmower 10. Additionally, the battery control substrates 104 are connected to an LCD monitor (display unit) 107, which displays a warning when an abnormality occurs in the battery unit BTU. It is desirable to mount the LCD monitor 107 on one of the running operation levers 22. In addition to displaying abnormality warnings for the battery unit BTU, the LCD monitor 107 can also display the speed of the electric lawnmower 10, the battery levels, the rotational speed (rpm) of the mower blades, etc.

In this embodiment, the system controller 106 detects various abnormalities on the basis of information from the battery control substrates 104 and directly sends an instruction to turn off the relay 103. Hence, the system controller 106 directly interrupts the power supply from the battery unit BTU to the driving units (mowing motors 15 and running motors 16). A single-pole circuit that interrupts only the relay 103, which is connected to the positive poles, may be employed.

For the purpose of electric shock prevention, this circuit constitutes a floating system by insulating the 12-V circuit for control and the 72-V circuit for driving. In this way, the negative poles of the battery unit BTU do not have to be interrupted during operation. That is, current interrupting means is not required on the negative pole side of the battery unit BTU, and the peripheral size of the battery unit BTU can be reduced.

By employing such a configuration for the battery controller CR, the interruption method of the driving power source can be simplified and the size can be reduced in comparison with a known configuration, which is illustrated in FIG. 8. In a conventional battery controller 200, two breakers 201 and 201 are disposed in parallel and are connected to the positive poles of the battery unit BTU. The downstream sides of the breakers 201 and 201 are connected to battery control substrates 204 via current sensors 202 and 202.

Positive-pole wires and negative-pole wires downstream of the battery control substrate 204 are connected to breakers 206. The breakers 206 are connected to a DC-to-DC converter 209 outside the battery controller 200, are reduced to 12 V to serve as a control power source, and are connected to a system controller 210. The system controller 210 controls running operation levers, input units, such as various switches, and output units, such as electromagnetic brakes and various lamps. Relays 205A, 205B, and 205C are interposed between the battery control substrates 204 and the breakers 206. Relays 205D and 205E are connected to the battery control substrates 204 as a separate circuit.

Reference characters SW11, SW12, SW21, SW22, and SW3 represent switches. When the any one of the breakers 206 is turned on, the relay 205A becomes conductive, and the switches SW11 and SW21 are turned on.

In addition to being connected to the battery control substrate 204, the downstream sides of the current sensors 202 and 202 are also connected to the mowing motors 15 and the running motors 16. The negative poles of the battery unit BTU are connected to the mowing motors 15 and the running motors 16 via breakers 211. Thus, the circuit is a so-called double pole circuit and has the breakers 201 and 211 provided on the positive poles and negative poles of the battery unit BTU.

Upon detection of an abnormality by the battery control substrates 204, the relay 205D becomes conductive, and the switch SW3 is turned on. When the switch SW3 is turned on, the relay 205E becomes conductive, and the switches SW12 and SW22 are turned on. When the switches SW12 and SW22 are turned on, an alert lamp (not shown) illuminates, and the breakers 206 are tripped.

Inside the battery controller 200, which has such a configuration, in addition to the breakers 201 and 206, the relays 205A, 205B, 205C, 205D, and 205E and the switches SW11, SW12, SW21, SW22, and SW3 are disposed, causing a problem in size increase (the battery controller 200 is approximately 700 mm in length, 430 mm in width, and 200 mm in height).

The electric lawnmower 10 may include a voltage-averaging circuit. The voltage-equalizing circuit balances the voltages among the cells and responds to a current. The principle thereof is illustrated in FIG. 17(a). This circuit includes batteries 301 and 302, coils 303 and 304, diodes 305 and 306, and switches 307 and 308. When the terminal voltage of the battery 302 is greater than the terminal voltage of the battery 301 (FIG. 17(b)), the switch 308 closes, the switch 307 opens, a current flows as indicated by the arrows as a result of the operation of a boosting converter, and the terminal voltage of the battery 302 is used for charging the battery 301. In contrast, when the terminal voltage of the battery 302 is smaller than the terminal voltage of the battery 301 (FIG. 17(c)), the switch 307 closes, the switch 308 opens, and a current flows as indicated by the arrows, equalizing both terminal voltages. When the battery are quickly charged, such a voltage equalization operation can suppress the variation in battery terminal voltages after charging, increasing the charging efficiency. When performing normal charging, the battery voltages can be controlled to a value equal to or smaller than a set value (i.e., overcharge protection). Thus, it is effective to perform the voltage equalization operation before charging the batteries.

FIG. 18 illustrates the principle of protection against overcharge. When the terminal voltage of the battery 302 reaches a set value, the switch 308 closes to store energy in the coil 304 as a magnetic flux (FIG. 18(*a*)). Subsequently, by opening the switch 308, the energy stored in the coil 304 is supplied to the battery 301 via the diode 306 (FIG. 18(*b*)). When the terminal voltage of the battery 301 reaches the set value, the switch 307 closes (FIG. 18(*c*)). Then, the excess charging current flowing into the battery 301 can be transmitted to the battery 302 by the booster converter. For sudden and large-current charging, it is desirable to protect the circuit by the use of a zener diode because the voltage instantaneously rises and might exceed the allowable voltage due to a delay in switching control. It is also effective to use a hysteresis comparator (schmitt trigger) to provide a margin to the reference voltage.

Figure 19:
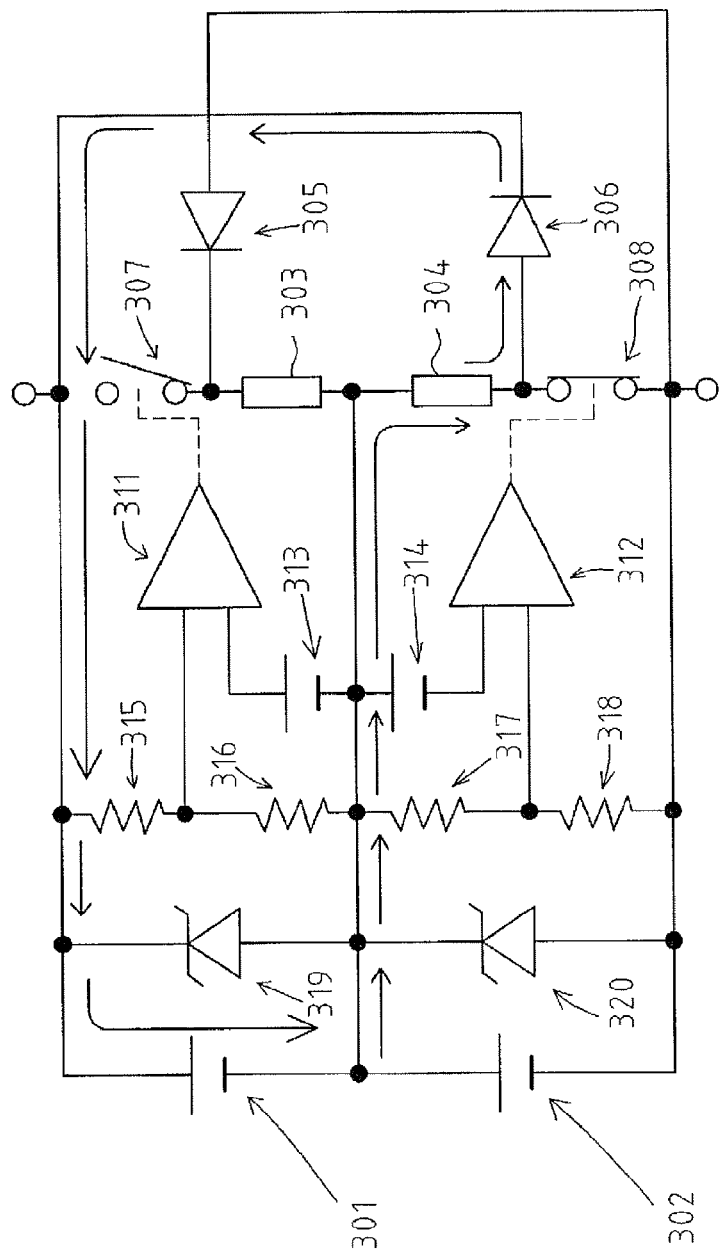
FIG. 19 is a circuit diagram illustrating a specific example of a voltage-equalizing circuit.

FIG. 19 illustrates an example voltage-equalizing circuit. This circuit is based on the circuits illustrated in FIGS. 17 and 18 and includes comparators 311 and 312, reference voltage unit 313 and 314, resistors 315, 316, 317, and 318, and zener diodes 319 and 320. According to the operating principle of the voltage-equalizing circuit, control elements are disposed in parallel to the load in accordance with a shunt regulator. When the load requires a large current to stabilize the output voltages, the current on the control element side is reduced, and when only a small current is required, the current on the control element side is increased. In other words, the current flowing through the control element and the output current are exchanged depending on the load status.

When the batteries 301 and 302 are charged with a charging current I and the terminal voltage of the battery 302 exceeds a set value E1 (potential difference across the battery 314 for setting terminal voltage), the comparator 312 transmits the current flowing into the battery 302 to the battery 301 via the diode 306 (arrow in drawing). Upon completion of charging, the voltage sum of the batteries 301 and 302 is detected (or, upon completion of charging, full-charge signals may be transmitted from the batteries 301 and 302).

Figure 20:
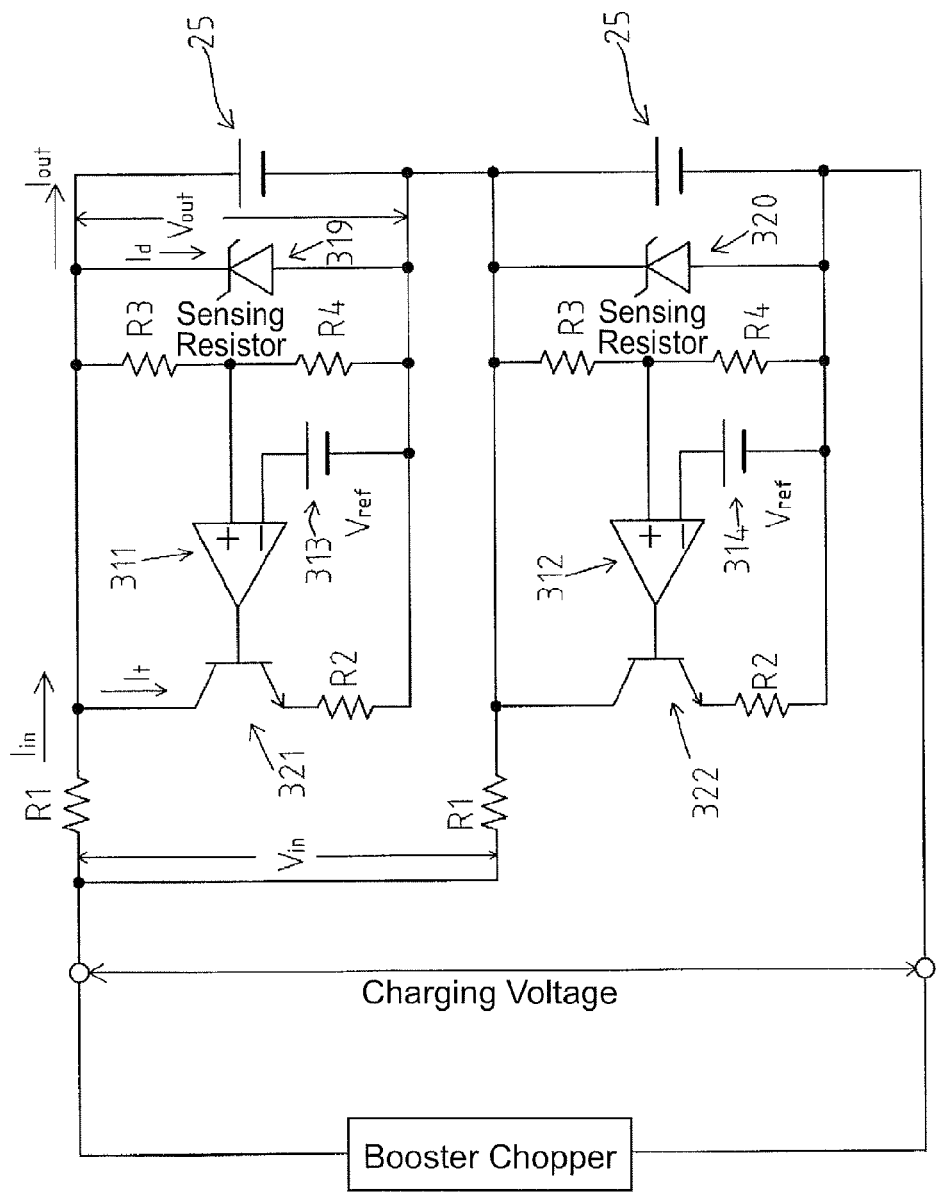
FIG. 20 is a circuit diagram illustrating a voltage-equalizing circuit according to an embodiment.

FIG. 20 illustrates an example voltage equalizing circuit that can be applied to the present invention. In this example, the control elements include MOS-FETs 321 and 322, comparators (error amplifiers) 311 and 312, reference voltage units 313 and 314, sensing resistors R3 and R4, and zener diodes (over-charge preventing units) 319 and 320. The charging voltage (Vin per battery module) is supplied to the control element via a limiting resistor R1. The output voltages Vout are resistively divided at the sensing resistors R3 and R4 and then compared with reference voltages (Vref) of the reference voltage units 313 and 314 at the comparators 311 and 312, respectively. The output voltages Vout are small when the load requires a large output current Iout (i.e., when the battery levels are low), and thus, the voltages of the reference voltage units 313 and 314 become larger, controlling the currents It of the MOS-FETs 321 and 322 to be reduced. When the output current Iout may be a small load (i.e., when the battery levels are sufficient), the output voltages Vout increase and the voltages on the reference voltage side becomes smaller; therefore, the MOS-FETs 321 and 322 are controlled to increase the currents It such that the output voltages (battery voltages) are always constant. To prevent overvoltage, the zener diodes 319 and 320 are disposed in parallel to bypass the charging current when the voltage exceeds a predetermined value.

Figure 21:
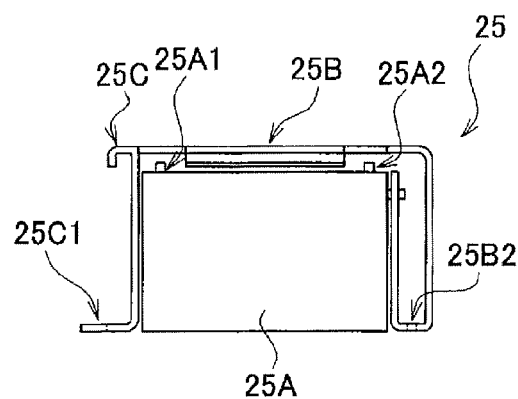
FIG. 21 is a front view of a battery in the electric lawnmower.

Each battery 25 has a structure such as that illustrated in FIG. 21. Each battery 25 includes a battery main body 25A and battery supporting bodies 25B and 25C surrounding thereof. It is desirable to use a lithium ion battery as the battery main body 25A. Specifically, it is desirable to use batteries having a high energy density and a long life, such as lithium-manganese dioxide batteries, graphite-lithium fluoride batteries, lithium-thionyl chloride batteries, lithium-copper oxide batteries, lithium-iron disulfide batteries, or iodine-lithium batteries. Electrodes 25A1 and 25A2 protrude from the battery main body 25A.

The battery main body 25A, which is supported by the battery supporting bodies 25B and 25C, is mounted to the deck panel 31 with bolts passed through a through-hole 25B2 and a notch 25C1. One of the batteries 25 is mounted inside the battery case 44 with bolts passed through the through-hole 25B2 and the notch 25C1.

A method of replacing the batteries 25 will be described below. First, the cowling 20 is lifted up from the rear part of the electric lawnmower 10. In response, the cowling 20 pivots upward around the flat-head pins 17D, which serves as pivot support points. At this time, the dampers 50 extend upward to support the lifting of the cowling 20. Then, upon full extension of the dampers 50, the lifting of the cowling 20 stops. Next, the bolts are loosened to remove the protective frames 41A, 41B, and 41O. At this time, the bolts at the connecting area of the reinforcement panel 43B and the protective frame 41D are also loosened, and the reinforcement panel 43B is removed from the protective frame 41D. In this way, the five batteries 25, which are horizontally placed on the chassis 11, are exposed. Then, the bolts fastened to the battery supporting bodies 25B and 25C are loosened to remove the batteries 25 from the deck panel 31.

The bolts of the battery case 44, which is disposed below the chassis 11, is loosened to remove the opening/closing lid 44A. Then, the bolts fastening the battery supporting bodies 25B and 25C are loosened to remove the battery 25 from the battery case 44.

The six batteries 25 removed in this way are replaced with new ones (or charged) and are mounted to the electric lawnmower 10 through a reverse procedure of that described above. Then, the cowling 20 is closed.

Figure 22:
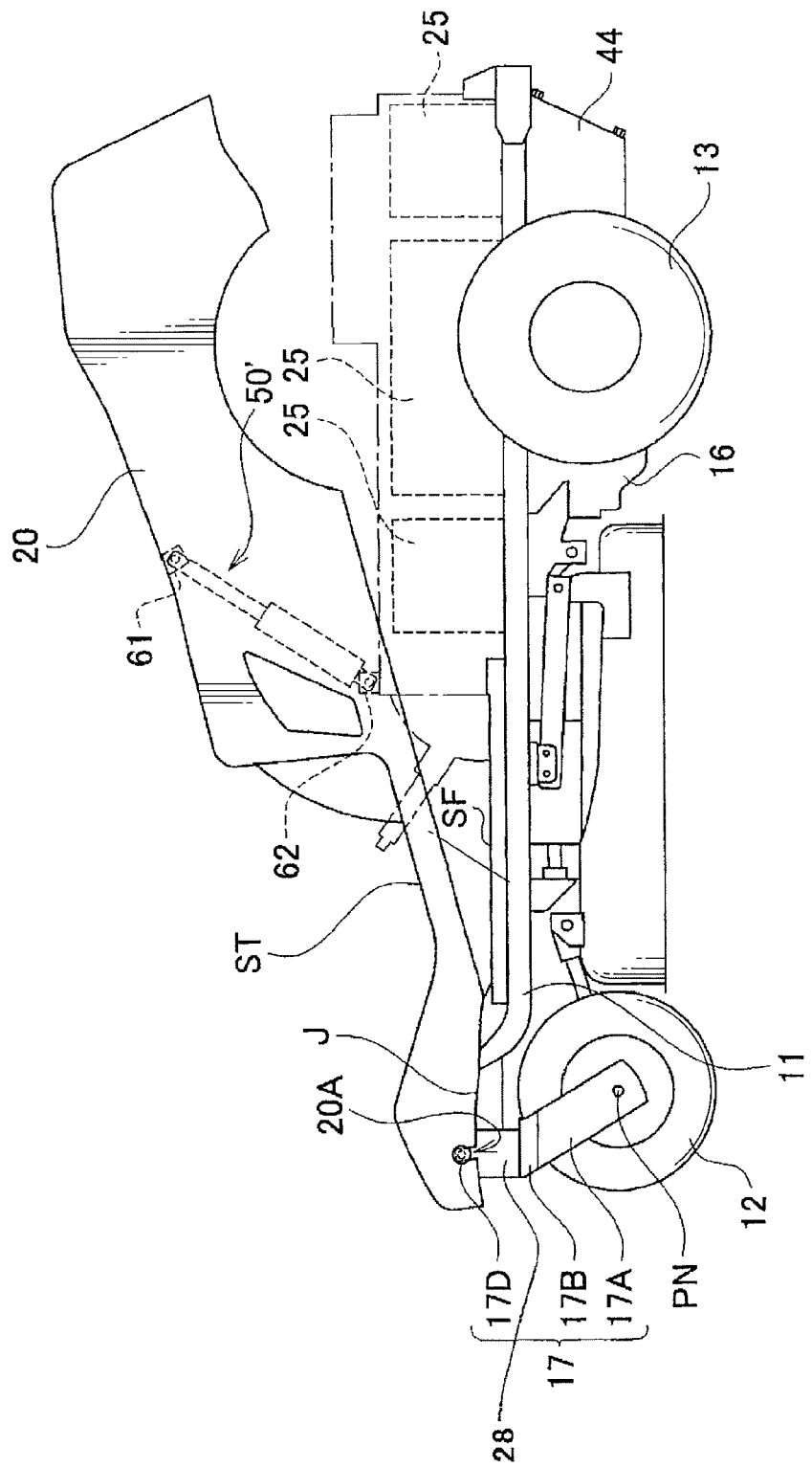
FIG. 22 is a side view of an electric lawnmower according to another embodiment with the cowling open.
Figure 23A:
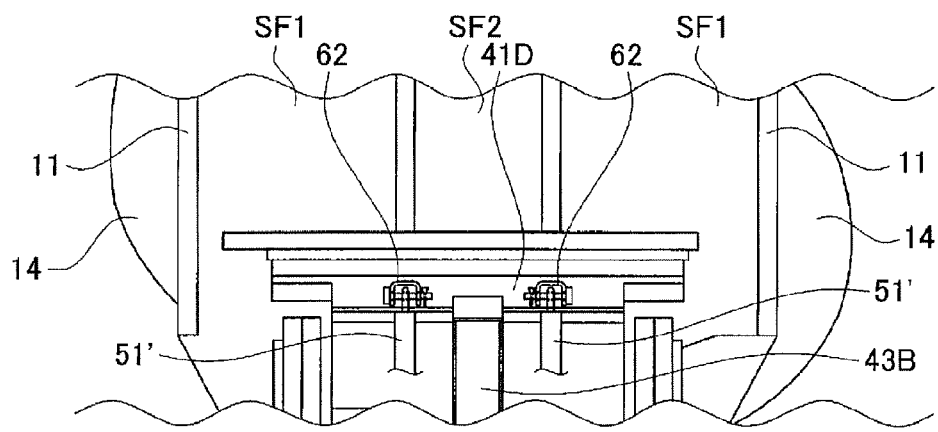
FIG. 23(a) is a schematic plan view of essential parts near a protective frame.

FIGS. 22 and 23 illustrate another embodiment of the present invention. In this embodiment, since the configurations and operations of the electric lawnmower 10, except that the positions of the dampers 50 is different, are the same as those of the embodiment described above, descriptions thereof are omitted. Dampers 50' each include a damper main body 51', which has a spring function, and a damper rod 52', which protrudes/retracts from/to the inside of the damper main body 51'. A connecting part 51'A is fixed to the tip of the damper main body 51'. The tip of the connecting part 51'A is a rounded iron plate, and a through-hole 51'A1 is formed in the center part. A connecting part 52'A is fixed to the tip of the damper rod 52'. The tip of the connecting part 52'A is a rounded iron plate, and a through-hole 52'A1 is formed in the center part.

In this embodiment, two frame-damper connecting devices 62 are fixed to the protective frame 41D with, for example, bolts. The frame-damper connecting devices 62 are each constituted of a rectangular iron piece bent in a U-shape and have through-holes 62*a* and 62*a* formed on both side parts. Another through-hole is formed in the center part bent in a U-shape for attachment to the protective frame 41D with a bolt.

The connecting part 51'A of the damper main body 51' is inserted into the U-shaped part of the frame-damper connecting device 62; a bolt 53 is inserted into one of the through-holes 62*a*, the through-hole 51'A1, and the other through-hole 62*a*, in this order; and then, a pin 54 is passed through the tip of the bolt 53 as a stopper. In this way, the damper main body 51' is pivotably attached to the protective frame 41D.

Cowling-damper connecting devices 61 are fixed to the cowling 20 with, for example, bolts. The cowling-damper connecting devices 61 are each constituted of a rectangular iron piece bent in a U-shape and have through-holes 61a and 61a formed on both side parts. Another through-hole is formed in the center part bent in a U-shape for attachment to the cowling 20 with a bolt.

The connecting part 52'A of the damper rod 52' is inserted into the U-shaped part of the cowling-damper connecting device 61; a bolt 55 is inserted into one of the through-holes 61a, the through-hole 52'A1, and the other through-hole 61a, in this order; and then, a pin 56 is passed through the tip of the bolt 55 as a stopper. In this way, the damper rod 52' is pivotably attached to the back surface of the cowling 20.

FIG. 24 illustrates another embodiment of the present invention. In this embodiment, the cowling is separated into forward and rearward halves at the rear edge of the step ST; the forward half is referred to as a cowling (forward cowling) 20A, and the rearward half is referred to as a cowling (rearward cowling) 20B. The cowling 20A is fixed to the chassis 11, and the cowling 20B pivots around pivoting pins RC, which serve as pivot support points, in the counterclockwise direction in the drawing. The pivoting pins RC are fixed to stays (not shown), which are fixed to the deck panel 31. Dampers 50" are attached to the cowling 20B and the protective frame 41D. Since other configurations and operations of the electric lawnmower 10 are the same as the two above-described embodiments, descriptions thereof are omitted.

Similar to dampers 50 and 50', which are described in the two embodiments above, the dampers 50" each include a damper main body, which has a spring function, and a damper rod, which protrudes/retracts from/to the inside of the damper main body. A connecting part (which is the same as the connecting part 51'A in FIG. 23 (b)) is fixed to the tip of the damper main body, and another connecting part (which is the same as the connecting part 52'A in FIG. 23(c)) is fixed to the tip of the damper rod.

Figure 23B:
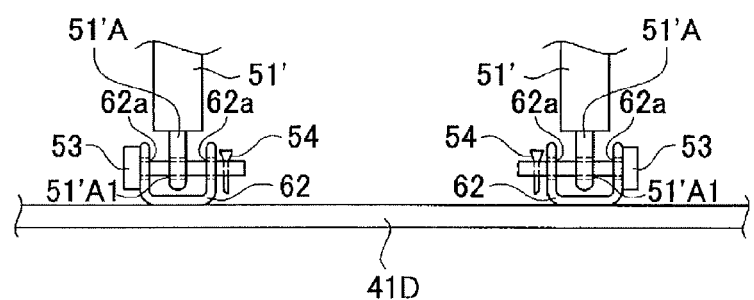
FIG. 23(b) is a side view of dampers attached to the protective frame.
Figure 23C:
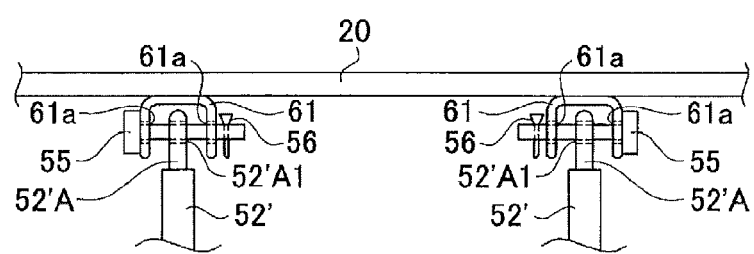
FIG. 23(c) is side view of the dampers attached to the back side of the cowling.

Two frame-damper connecting devices 65 (which are the same as the frame-damper connecting devices 62 in FIG. 23(b)) are fixed to the protective frame 41D with, for example, bolts. Cowling-damper connecting devices 64 (which are the same as the cowling-damper connecting devices 61 in FIG. 23(c)) are fixed to the back surface of the cowling 20B with, for example, bolts. The frame-damper connecting devices 65 and the protective frame 41D are attached at the same positions as those illustrated in FIGS. 23(a) and 23(b), and the cowling-damper connecting devices 64 are attached to the same positions as those illustrated in FIG. 23(c).

A connecting part at one end of the damper 50" is pivotably attached to the corresponding frame-damper connecting device 65 (the damper main body is pivotably attached to the protective frame 41D). The other ends of the damper 50" is pivotably attached to the corresponding cowling-damper connecting device 64 (the damper rod is pivotably attached to the back surface of the cowling 20B).

In this way, by separating the cowling into forward and rearward halves, the size of the cowling to be opened when replacing the batteries 25 can be reduced, and the weight of the cowling to be pivoted can be reduced.

Figure 25A:
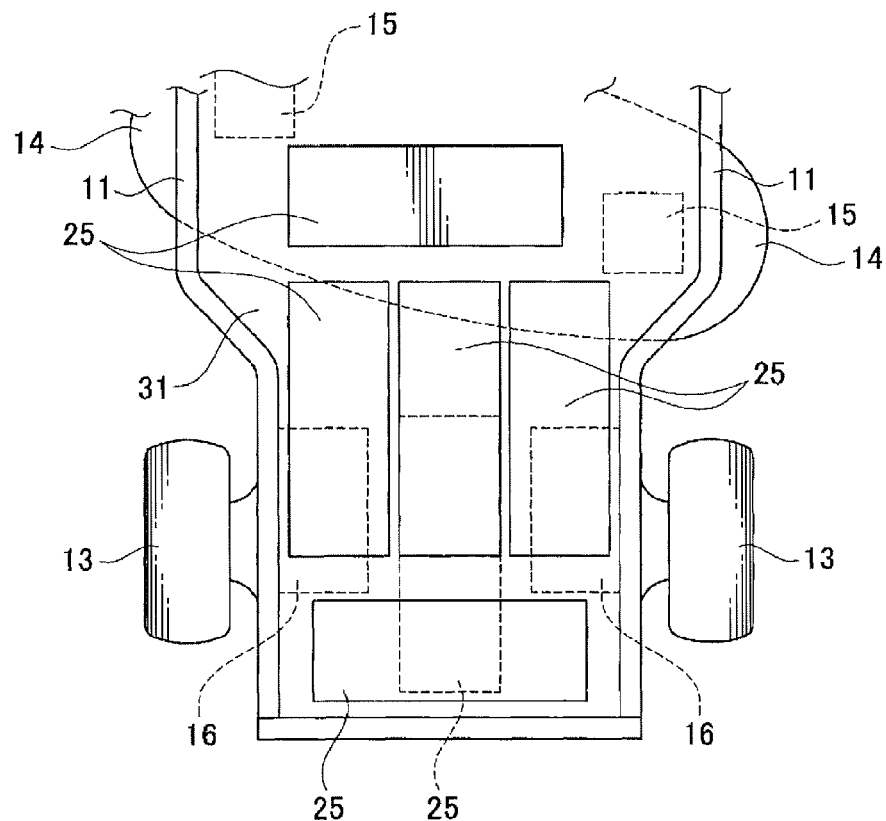
FIG. 25(a) is a schematic plan view of essential parts.
Figure 25B:
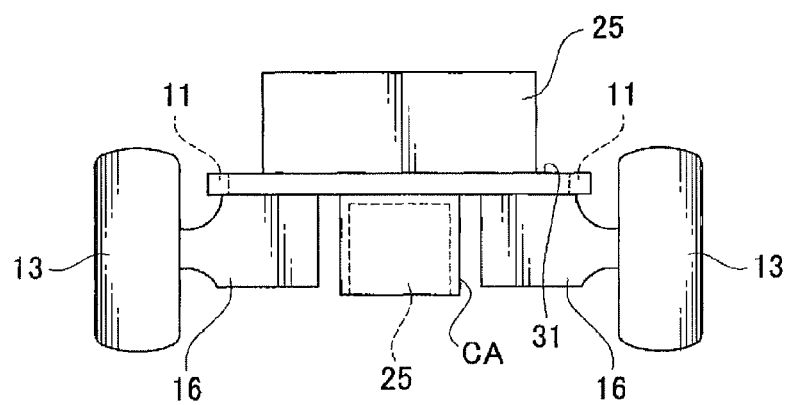
FIG. 25(b) is a schematic back view of essential parts.

As illustrated in FIGS. 25(a) and 25(b), the battery 25 below the chassis 11 may be disposed between the axles of the rear tires 13 and 13 or, more specifically, between the running motors 16 and 16 of the rear tires 13 and 13. Specifically, an iron battery case CA that covers a single battery 25 is fixed at the center of the chassis 11 in the width direction and on the back side of the deck panel 31. The battery case CA has an opening/closing lit on the rear side of the electric lawnmower 10 and allows the battery 25 to be removed by opening the opening/closing lid.

The electric lawnmower 10 according to the embodiments described above is a mower that discharges the mowed grass toward the right side of the electric lawnmower 10 (side-discharge type). In a side-discharge type electric lawnmower 10, two mower blades are positioned such that the line connecting the centers of rotation is disposed at a certain clockwise angle to the width direction of the mower. Thus, the mowing motors 15 and 15 directly connected to the mower blades also have the same layout. Since the batteries 25 and the mowing motors 15 are both heavy, the weight of the entire electric lawnmower 10 will be unbalanced if the batteries 25 are stacked on the mowing motors 15, and the risk of rolling over while driving will increase.

Hence, the battery 25 that is placed foremost in the forward-traveling direction of the electric lawnmower 10, among the five batteries 25 placed on the deck panel 31, is disposed eccentrically leftward to the center of the width direction of the electric lawnmower 10 to balance weight with the mowing motors 15.

Figure 26:
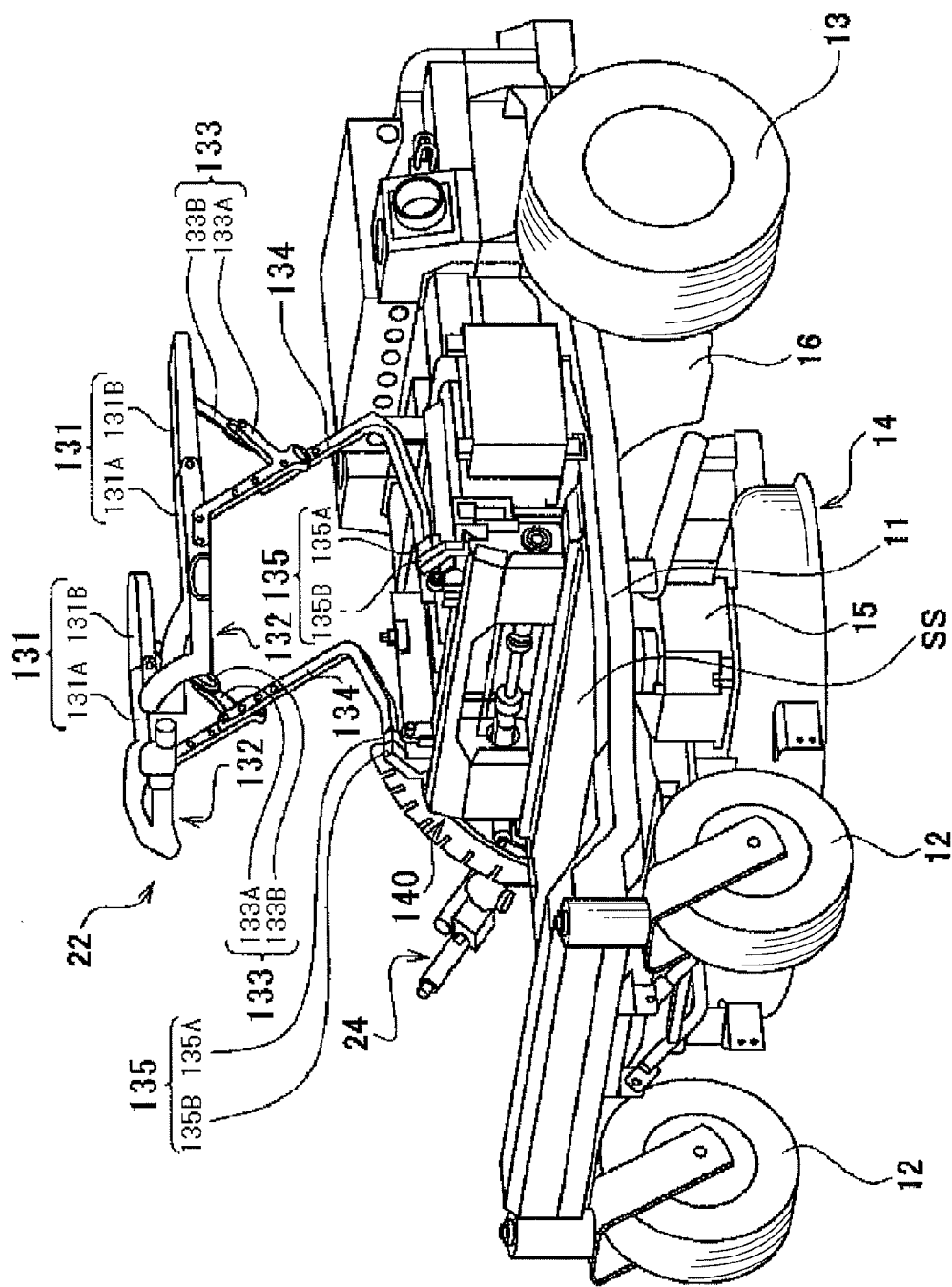
FIG. 26 is an enlarged perspective view of part of the electric lawnmower.
Figure 27:
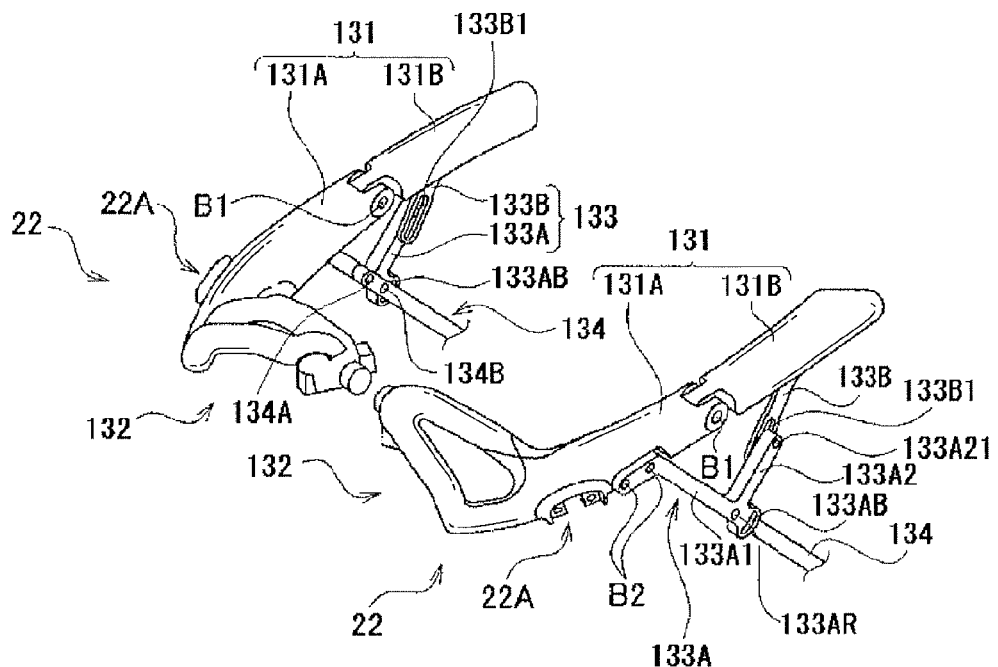
FIG. 27 is a perspective view of running operation levers.
Figure 28:
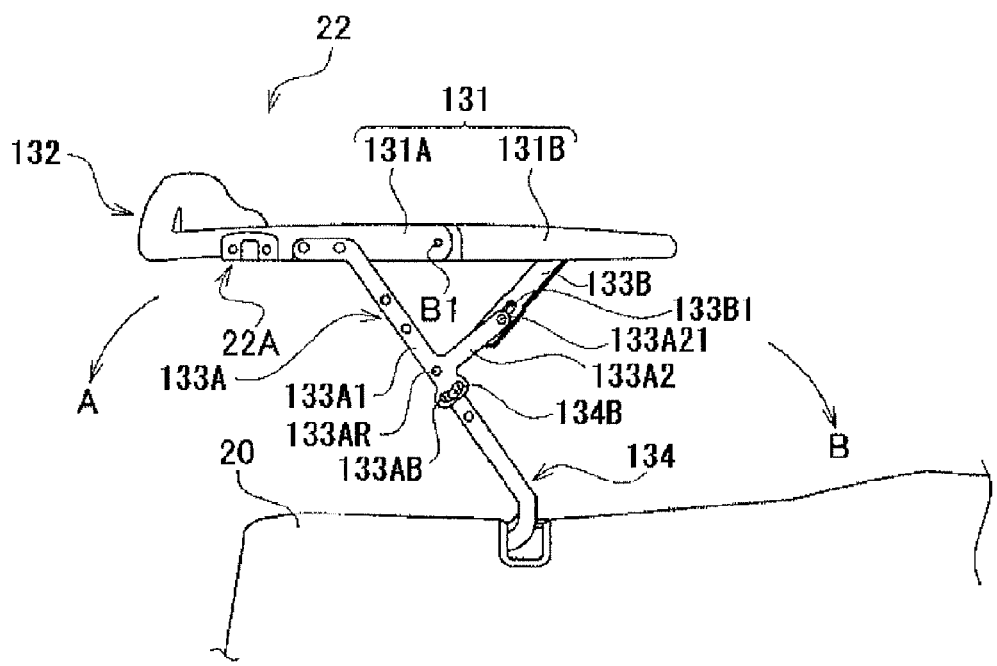
FIG. 28 is a side view of a running operation lever.
Figure 29:
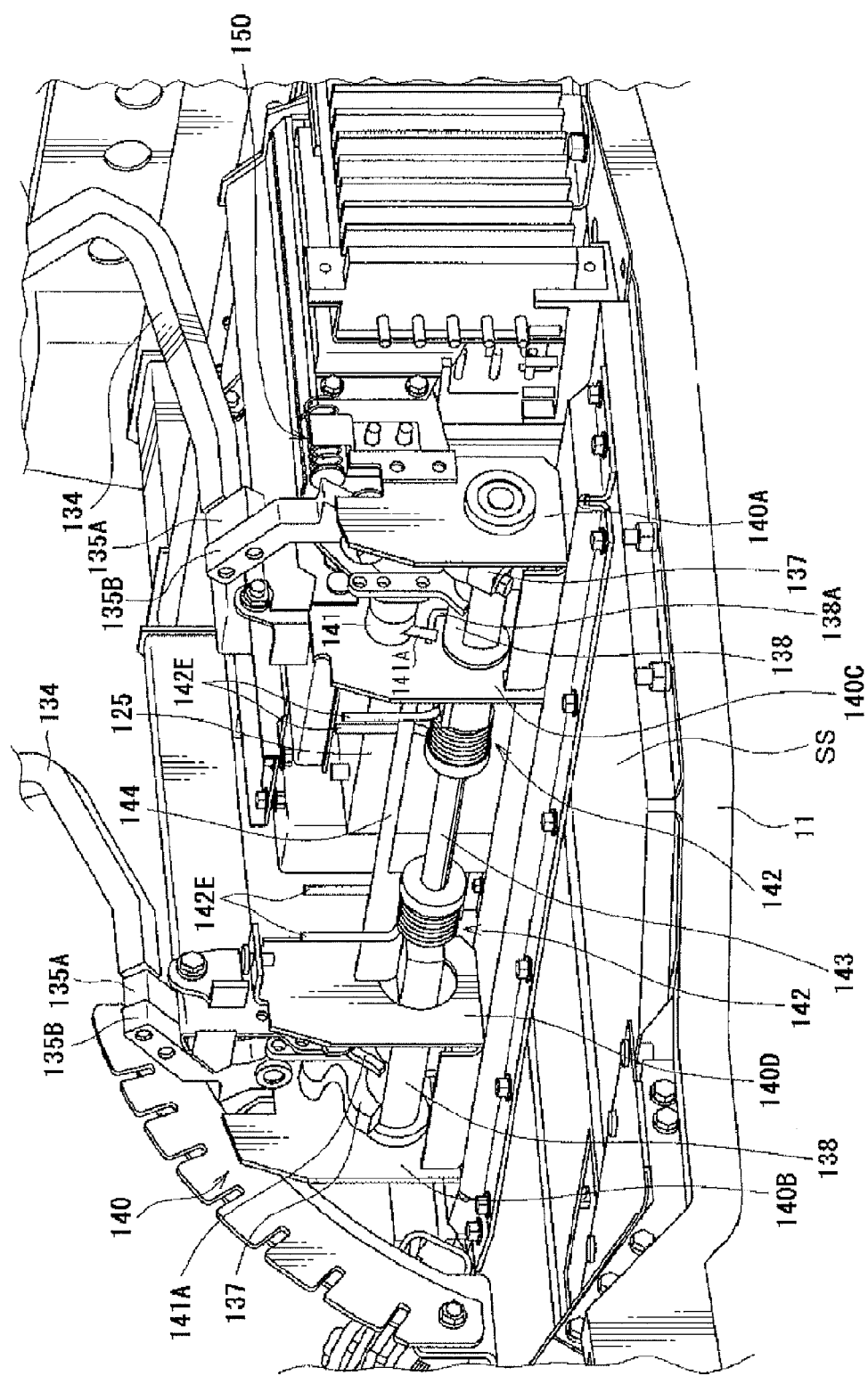
FIG. 29 is a partially enlarged view of FIG. 26.

FIGS. 26 to 29 illustrate the attachment structure of the running operation levers 22 according to this embodiment (in FIGS. 26 and 29, the cowling 20 is removed for the purposes of illustration). Each running operation lever 22 includes an arm rest 131 and a grip 132, which is disposed continuously to the front edge of the arm rest 131. The grip 132 is held when an operator operates the running operation lever 22 and has three difference grip positions, which are described below. The arm rest 131 is where the operator places his or her front arm and elbow when holding the grip 132. The arm rest 131 includes a front member 131A and a rear member 131B, and both members are connected and fixed to each other with a bolt B1 (as described below, by loosening the bolt B1, the rear member 131B is pivotable with respect to the front member 131A).

The arm rest 131 and the grip 132 are made of light and highly workable material, such as FRP (reinforced plastic). The front member 131A of the arm rest 131 and the grip 132 are integrated into a single unit. Reference characters 22A represent an attachment part for attaching accessories (includes two attachment bolts), and, as described below, a monitor (display unit) may be attached thereto.

The arm rest 131 is supported by a V-shaped supporting frame 133 from below, and the lower part of the supporting frame 133 is attached to the upper end of a connecting frame 134. The supporting frame 133 includes iron frame members 133A and 133B. The iron frame member 133A is constituted of an integrated body of a main member 133A1 and a sub-member 133A2, which branches in a V-shape from the lower part of the main member 133A1. The upper end of the main member 133A1 is attached to the external surface of the front member 131A of the arm rest 131 with bolts B2. The upper end of the frame member 133B is attached to the inner back side of the rear member 131B of the arm rest 131 with bolts (not shown). A long hole 133B1 is formed in the lower part of the frame member 133B. A bolt (not shown) is passed through both a through-hole 133A21 formed at the tip of the sub-member 133A2 of the frame member 133A and a logn hole 133B1 in the frame member 133B to connect and fix the frame member 133A and the frame member 133B.

A through-hole 133AR is formed in the lower part of the frame member 133A, i.e., the base of the V-shape, and a long hole 133AB is formed slightly below the through-hole 133AR. Bolts (not shown) are passed through two through-holes 134A and 134B, which are formed side by side along the longitudinal direction at the upper end part of the connecting frame 134, the through-hole 133AR, and the long hole 133AB, to connect and fix the frame member 133A and the connecting frame 134.

The connecting frame 134 is a hollow horn-like frame (iron) substantially L-shaped in side view. A connecting member 135A is attached to the lower end of the connecting frame 134. A connecting member 135B is attached to the connecting member 135A, and a connecting member 137 is attached to the connecting member 135B. The lower end of the connecting member 137 is fixed to a pivoting member 138. The connecting member 137 and the pivoting member 138 are disposed inside a case 140. Both ends of the pivoting member 138 are pivotably supported by side panels 140A and 140B, which constitute the case 140. Intermediate panels 140C and 140D are disposed inside the case 140, and potentiometers 141 and 141 are fixed to the external surfaces thereof (in the mower-width direction of the electric lawnmower 10) (FIG. 6 illustrates a state in which the upper and front panels of the case 140 are removed). The case 140 is fixed on a deck panel SS, which is bridged across the paired chassis 11, with bolts (the step ST is placed on the deck panel SS when the cowling 20 is closed).

A plate-like contact piece 141A protrudes from each potentiometer 141. A hook-like contact rod 138A is provided in contact with the rear part of the contact piece 141A. The contact rod 138A protrudes from a cylindrical side surface of the pivoting member 138. The potentiometer 141 is urged in the rearward-traveling direction (of the electric lawnmower 10) by a spring (not shown).

The pivoting member 138 is pivotably attached to each end of an intermediate member 143. Coil springs 142 and 142 are fixed to the intermediate member 143. A latching plate 144 is disposed between both ends 142E of the coil springs 142. The latching plate 144 is fixed to the left and right pivoting members 138, pivoting as an integrated unit. In contrast, the intermediate member 143 is fixed to the main body frame and does not pivot in cooperation with the pivoting members 138 and 138 and the latching plate 144. When one of the left and right running operation levers 22 and 22 is pivoted in the forward-traveling (or rearward traveling) direction, the intermediate member 143 moves in cooperation with the other (i.e., for example, when the right running operation lever 22 is pivoted in the forward-traveling direction, the left running operation lever 22 pivots in the forward-traveling direction in synchronization therewith). In contrast, when the right running operation lever 22 pivots in the rearward-traveling direction, the left running operation lever 22 retains a neutral position, regardless of the operation of the intermediate member 143. This is because a coil spring 150 adjoins the back side of the left running operation lever 22, and the coil spring 150 prevents the rearward pivoting of the left running operation lever 22 by an urging force greater than the urging force of the coil springs 142 in the intermediate member 143 (thus, for the left running operation lever 22 to pivot in the rearward-traveling direction, it must be pivoted rearward against the urging force of the coil spring 150). Since the coil springs 142 are disposed on both sides of the intermediate member 143, the left coil spring 142 is in charge of to the pivoting of the left running operation lever 22, and the right coil spring 142 is in charge of the pivoting of the right running operation lever 22, and the difference in pivoting when the left and right running operation levers 22 are in cooperation can be suppressed.

Due to the above-described configuration, the running operation levers 22 can pivot in the forward and rearward in the running direction of the electric lawnmower 10, where pivoting member 138 serves as a pivot support point.

A method of rotating the running motors 16 by operating the running operation levers 22, which has the above-described configuration, will be described. When the running operation lever 22 on the left side of the operator's seat 21 pivots in the direction of arrow A in FIG. 5 (counterclockwise in the right side view of the electric lawnmower 10), the pivoting member 138 pivots in the running direction (of the electric lawnmower 10). At this time, the contact rod 138A pushes the contact piece 141A and causes the corresponding potentiometer 141 to pivot in the clockwise direction (in the right side view of the electric lawnmower 10). The potentiometer 141 converts the pivot angle to an electric signal and sends this to a controller. The controller determines the rotating direction of the running motor 16 that is disposed on the left side of the electric lawnmower 10 on the basis of the signal, calculates the rotational speed (rpm), and rotates the running motor 16 in the forward-traveling direction at a predetermined rotational speed via a motor driver. A large pivot angle of the running operation lever 22 results in great rotational speed of the running motor 16.

Similarly, when the running operation lever 22 on the left side of the operator's seat 21 pivots in the direction of arrow B in FIG. 5 (clockwise in the right side view of the electric lawnmower 10), the pivoting member 138 pivots in the rearward-traveling direction (of the electric lawnmower 10). At this time, the contact rod 138A pivots in a direction away from the contact piece 141A, but since the potentiometer 141 is urged in the counterclockwise direction by the spring, the corresponding potentiometer 141 pivots in the counterclockwise direction (in the right side view of the electric lawnmower 10) by following the contact rod 138A. The potentiometer 141 converts the pivot angle to an electric signal and sends this to a controller. The controller determines the rotating direction of the running motor 16 that is disposed on the left side of the electric lawnmower 10 on the basis of the signal, calculates the rotational speed (rpm), and rotates the running motor 16 in the rearward-traveling direction at a predetermined rotational speed via a motor driver. A large pivot angle of the running operation lever 22 results in great rotational speed of the running motor 16.

When the running operation lever 22 on the right side of the operator's seat 21 is operated, the running motor 16 disposed on the right side of the electric lawnmower 10 rotates in the same manner as described above.

To simultaneously rotate the running motors 16 and 16 on the left and right sides of the electric lawnmower 10, the running operation levers 22 and 22 on both sides of the operator's seat 21 may be operated simultaneously.

Figure 30A:
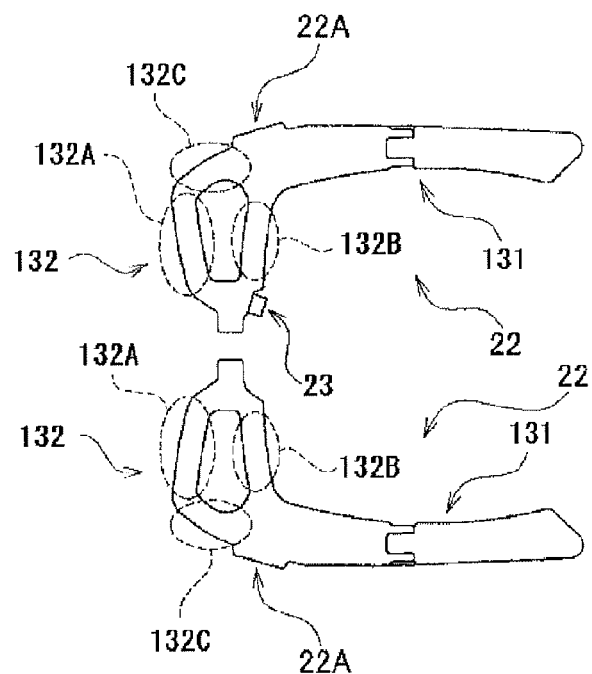
FIG. 30(a) is a plan view of essential parts of running operation levers.
Figure 30B:
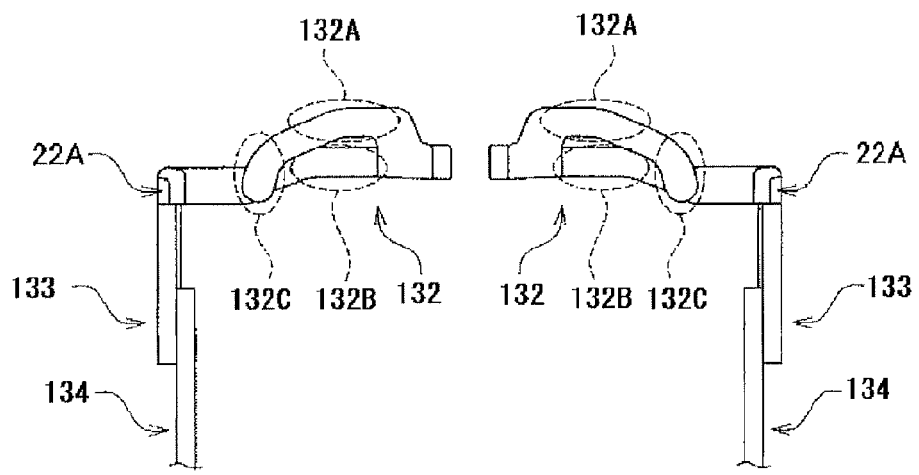
FIG. 30(b) is a front view of the running operation levers.

As illustrated in FIG. 30, the grips 132 and 132 each have three different grip positions 132A, 132B, and 132C. The grip position 132A is a position farthest from the operator's seat 21 and is the highest position. The grip position 132B is a position closest to the operator's seat 21 and is a position at an intermediate height. The grip position 132C is a position at an intermediate distance from the operator's seat 21 and is the lowest position. Additionally, the grip position 132C is the outermost position with respect to the other two grip positions. In this way, since the three grip positions 131A to 131C differ in the height direction and the horizontal direction, the most comfortable positions for operation can be selected for operators having different figures.

A mower-blade switch 23 for simultaneously turning on/off the rotation of the two mower blades is disposed near the right grip 132. In this way, the mower-blade switch 23 can be pushed with the thumb while holding the grip 132 at the grip position 132B to turn on/off the rotation of the mower blades while running the electric lawnmower 10, and thus, work can be carried out effectively.

Figure 31A:
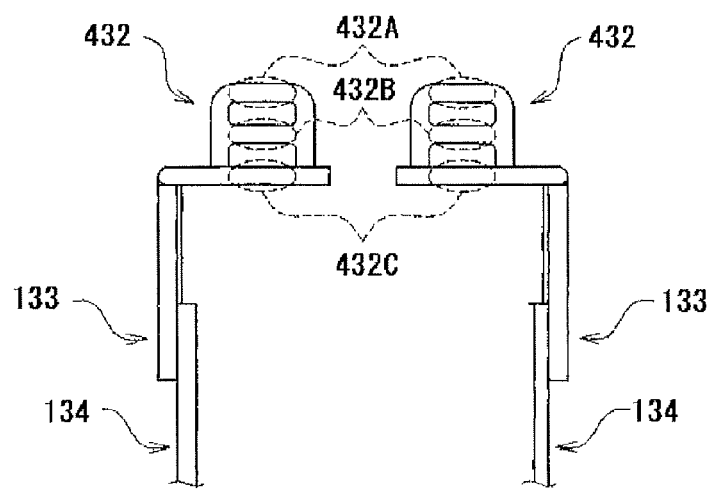
FIGS. 31(a) to 31(c) illustrate running operation levers according to other embodiments of the present invention, where
Figure 31B:
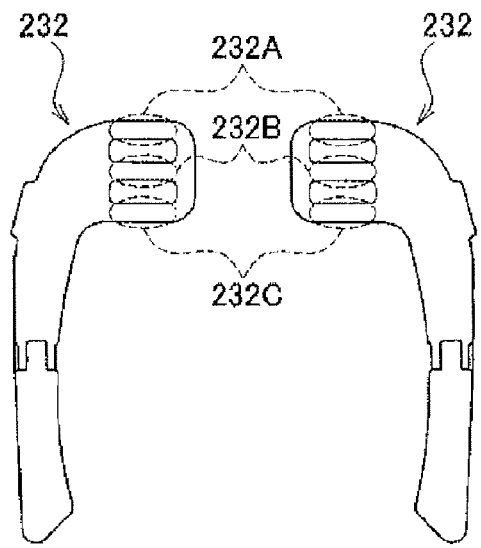
Figure 31C:
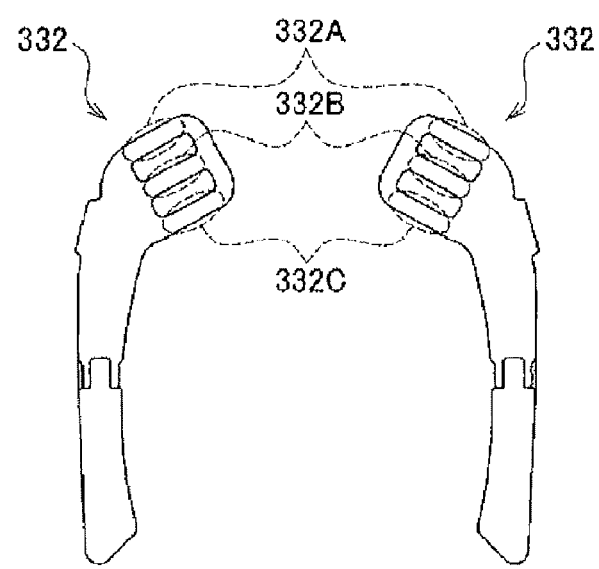

As illustrated in FIG. 31(a), grips 432 may have three grip positions 432A, 432B, and 432C, which are the same positions in the horizontal direction but different positions in the height direction. As illustrated in FIG. 31(b), grips 232 may have three grip positions 232A, 232B, and 232C, which are the same positions in the height direction but different positions in the anteroposterior (horizontal) direction. As illustrated in FIG. 31(c), grips 332 may have three grip positions 232A, 232B, and 232C, which are the same positions in the height direction but different positions in the anteroposterior and left-to-right (horizontal) directions.

Figure 32A:
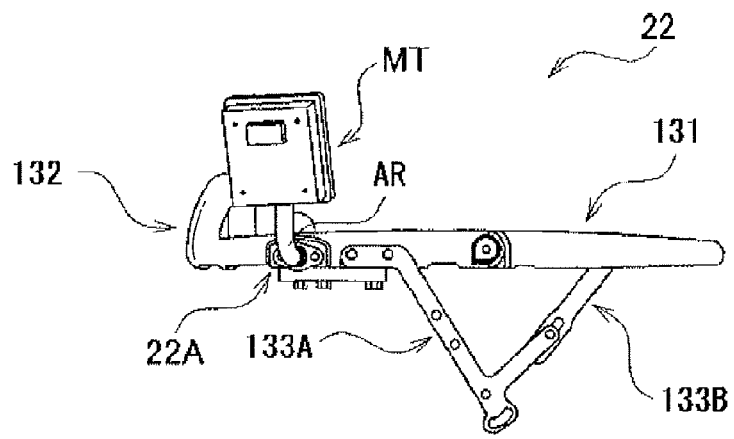
FIG. 32(a) is a right side view.
Figure 32B:
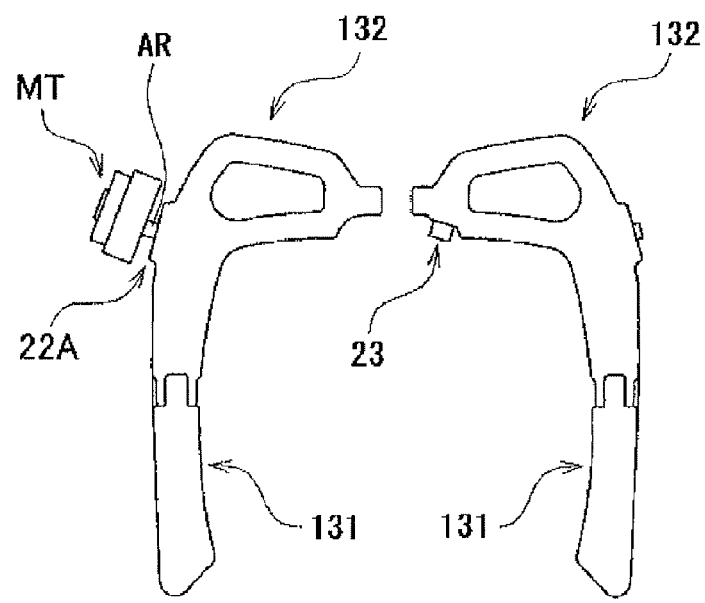
FIG. 32(b) is a plan view.
Figure 33:
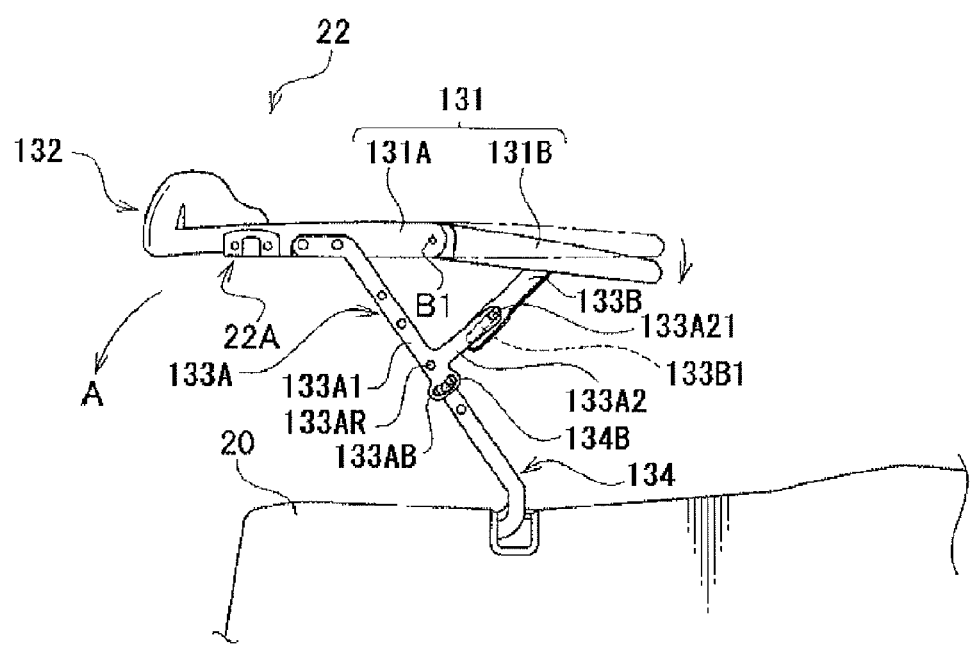
FIG. 33 is a right side view of FIG. 28 with the rear member of the arm rest pivoted.

As illustrated in FIG. 32, a monitor (display unit) MT may be mounted to an attachment part 22A near one of the grips 132. The monitor MT can constantly display, for example, the running speed of the electric lawnmower 10, the levels of the batteries 25, the rotational speed of the mower blades, and the rotational speed of the running motors 16. When a defect in the batteries, the mowing motors 15, the running motors 16, the controllers, etc., occurs, an alert may be displayed. A known technology is used as a method of displaying such various contents. Reference characters AR represent an action arm, which connects the monitor MT and the attachment part 22A. The monitor MT can be positioned at an optimal angle (position) by moving the action arm.

In the embodiment described above, the mower-blade switch 23, which is capable of simultaneously turning on/off the rotation of the two mower blade, is disposed near the right grip 132. The present invention, however, is not limited thereto, and another mower-blade switch 23 may be disposed near the left grip 132 and at a position symmetric to the one disposed on the right grip 132, and the left and right mower blades may be turned on/off with the corresponding mower-blade switches 23 and 23. In this way, it is possible to rotate a single mower blade, and the batteries 25 can be conserved during operation for mowing a small area.

FIG. 32 illustrates a method of changing the angle of the arm rest 131. Most of the time, the operator's front arm is placed on the front member 131A of the arm rest 131, and the elbow is placed on the rear member 131B, but sometimes, it is more comfortable when the position of the elbow is lower than the position of the front arm. For such a case, the rear member 131B of the arm rest 131 according to this embodiment can pivot downward. To pivot the rear member 131B downward, first, the bolt B1 connecting and fixing the front member 131A and the rear member 131B is loosened, and a bolt (not shown) that connects and fixes the frame member 133A and the frame member 133B (the bolt inserted to the long hole 133B1) is loosened. In this state, the rear member 131B is pivoted by a desired angle in the clockwise direction in the drawing (it is clear that the pivotable angle is within the range of the long hole 133B1). Then, the bolt B1 is tightened again to fix the front member 131A and the rear member 131B, and the bolt (not shown) is tightened to fix the frame member 133A and the frame member 133B.

The grip positions according to the present invention are not limited to three positions. The driving units for mowing and the driving unit for running are not limited to motors but may instead be engines.

INDUSTRIAL APPLICABILITY

The electric riding mower according to the present invention is not limited to lawn-mowing but may also be applied to any type of mowing operation. The driving source is not limited to a motor but may instead be an engine.

REFERENCE SIGNS LIST 10 electric lawnmower (electric riding mower)
11 chassis
12 front tire (front wheel)
12A front wheel shaft
13 rear tire (rear wheel)
14 mower deck
15 mowing motor
16 running motor
17D flat-head pin (pivot support point)
20 cowling
20A cowling (front cowling)
20B cowling (rear cowling)
21 operator's seat
22 running operation lever
23 mower-blade switch
25 battery
32 upper-surface part (driver storage part)
33 front-surface part (driver storage part)
33SL slit (air intake part)
34 side part (driver storage part)
35 bottom part (driver storage part)
41A, 41B, 41C, 41D protective frame
44 battery case
50, 50', 50" damper
60, 61, 64 cowling-damper connecting device
62, 65 frame-damper connecting device
103 relay (current interrupting means)
104 battery control substrate
105 breaker
106 system controller
107 LCD monitor
108 safety plug
132, 232, 332, 432 grip
132A, 132B, 132C, 232A, 232B, 232C, 332A, 332B, 332C,
432A, 432B, 432C grip position
CR battery controller
F fan
FG groove
FT front end part (of electric lawnmower 10)
MD mower-motor driver
MT monitor (display unit)
SC screen
SF step supporting plate
ST step
ST1 front end part (of step ST)

The invention claimed is:

1. An electric riding mower comprising:
two running motors independently driving paired driving wheels;
a mower blade mowing grass by being rotated;
a mowing motor rotating the mower blade;
a battery supplying electric power to the running motors and the mowing motor; and
a mower-motor driver controlling the rotational speed of the mowing motor, the mower-motor driver being disposed in a driver storage part on a front part of the mower;
an air intake part taking in external air is disposed on a front surface of the driver storage part;
a chassis;
a cowling covering the entire chassis from above;

an operator's seat; and a protective frame covering the battery from above for protection, wherein a cowling pivot support point allowing the cowling to pivot above the chassis is disposed on a front part of the mower, a step configured to place feet of an operator seated in the operator's seat is disposed on the cowling, a step support panel supporting the step from below is fixed to the chassis, a damper supporting the opening/closing of the cowling is interposed between a back side of the cowling and the protective frame, a frame-damper connecting device is fixed to the protective frame to pivotably fix one end of the damper, and a cowling-damper connecting device is fixed to the back side of the cowling to pivotably fix the other end of the damper, and wherein said battery includes a plurality of the batteries, the batteries being disposed horizontally on a rear part of the chassis.

2. The electric riding mower according to claim 1, wherein the damper comprises two dampers disposed side by side in the width direction of the mower.

\* \* \* \* \*